(12) United States Patent
Cook et al.

(10) Patent No.: US 7,598,473 B2
(45) Date of Patent: Oct. 6, 2009

(54) GENERATING DISCRETE GAS JETS IN PLASMA ARC TORCH APPLICATIONS

(75) Inventors: David Jonathan Cook, Bradford, VT (US); Stephen M. Liebold, Grantham, NH (US); Jon W. Lindsay, Hanover, NH (US); Zheng Duan, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 322 days.

(21) Appl. No.: 11/432,282

(22) Filed: May 11, 2006

(65) Prior Publication Data
US 2006/0289398 A1    Dec. 28, 2006

Related U.S. Application Data

(60) Provisional application No. 60/680,184, filed on May 11, 2005.

(51) Int. Cl.
H05B 1/02 (2006.01)
(52) U.S. Cl. .............. 219/121.5; 219/121.51; 219/75; 313/231.31
(58) Field of Classification Search ............ 219/121.48, 219/121.5, 121.51, 121.52, 74, 75; 313/231.31, 313/231.41
See application file for complete search history.

(56) References Cited

U.S. PATENT DOCUMENTS

| | | | | |
|---|---|---|---|---|
| 4,954,683 | A | * | 9/1990 | Hatch ...................... 219/121.5 |
| 5,164,568 | A | | 11/1992 | Sanders |
| 5,208,448 | A | | 5/1993 | Everett |
| 5,451,739 | A | | 9/1995 | Nemchinsky et al. |
| 6,069,339 | A | * | 5/2000 | McGrath et al. ........ 219/121.44 |
| 6,096,992 | A | * | 8/2000 | Severance, Jr. ........... 219/121.5 |
| 6,118,097 | A | * | 9/2000 | Kaga et al. ............. 219/121.84 |
| 6,172,323 | B1 | | 1/2001 | Ishide et al. |
| 6,610,959 | B2 | | 8/2003 | Carlson et al. |
| 6,667,459 | B1 | | 12/2003 | Woods et al. |

(Continued)

FOREIGN PATENT DOCUMENTS

EP    0941018 A2    3/1999

(Continued)

OTHER PUBLICATIONS

Invitation to Pay Additional Fees from the International Searching Authority.

*Primary Examiner*—Mark H Paschall
(74) *Attorney, Agent, or Firm*—Proskauer Rose LLP

(57) ABSTRACT

The invention is generally directed to a nozzle for a plasma torch, the nozzle having a rear portion that defines at least a portion of a plasma chamber and a front portion that includes a first end and a second end. The first end is adjacent the rear portion, and the second end defines a plasma exit portion. One or more fluid passageways are disposed within the front portion and extend from the first end to the second end. The fluid passageways have passageway exit portions that provide one or more discrete jets of a secondary fluid to surround a plasma jet that is ejected from the plasma exit portion. Features of the invention include faster cutting, thicker workpiece piercing capability, reduced noise, improved arc stability, and increased consumable life, all of which improve productivity associated with plasma arc torch workpiece processing.

15 Claims, 22 Drawing Sheets

U.S. PATENT DOCUMENTS

| | | |
|---|---|---|
| 6,774,336 B2 | 8/2004 | Horner-Richardson et al. |
| 6,924,004 B2 | 8/2005 | Rao et al. |
| 2001/0025833 A1 | 10/2001 | Kelkar et al. |
| 2002/0150669 A1 | 10/2002 | Pui et al. |
| 2004/0177807 A1 | 9/2004 | Pui et al. |
| 2005/0082263 A1 | 4/2005 | Koike et al. |

FOREIGN PATENT DOCUMENTS

| | | |
|---|---|---|
| EP | 1395097 A2 | 3/2004 |
| EP | 1524887 A2 | 4/2005 |
| FR | 2703557 A1 | 3/1993 |
| WO | 03/089178 A1 | 10/2003 |
| WO | 2006/039890 A2 | 4/2006 |

* cited by examiner

GENERATING DISCRETE GAS JETS IN PLASMA ARC TORCH APPLICATIONS

CROSS REFERENCE TO RELATED APPLICATIONS

This application claims the benefit of U.S. patent application Ser. No. 60/680,184, filed May 11, 2005, the entirety of which is hereby incorporated herein by reference.

TECHNICAL FIELD

The invention relates generally to plasma arc torch operations used for workpiece processing, for example, cutting, piercing or marking metal workpieces and particularly to improved flow of a plasma jet.

BACKGROUND

Plasma arc torches are widely used for workpiece processing, e.g., the cutting, piercing, and/or marking of metallic materials (i.e., elemental metals, metal alloys. etc.). A plasma arc torch generally includes an electrode mounted within a body of the torch (i.e., a torch body), a nozzle having a plasma exit portion (sometimes called an exit orifice or exit port) also mounted within the torch body, electrical connections, fluid passageways for cooling fluids, shielding fluids, and arc control fluids, a swirl ring to control fluid flow patterns in a plasma chamber formed between the electrode and nozzle, and a power supply. The torch produces a plasma arc, which is a constricted ionized jet of a plasma gas with high temperature and high momentum (i.e., an ionized plasma gas flow stream). Gases used in the plasma arc torch can be non-oxidizing (e.g., argon, nitrogen) or oxidizing (e.g., oxygen, air).

In operation, a pilot arc is first generated between the electrode (i.e., cathode) and the nozzle (i.e., anode). Generation of the pilot arc may be by means of a high frequency, high voltage signal coupled to a DC power supply and the plasma arc torch, or any of a variety of contact starting methods. In some configurations, a shield is mounted to the torch body to prevent metal that is spattered from the workpiece (sometimes referred to as slag) during processing from accumulating on torch parts (i.e., the nozzle or the electrode). Generally, the shield includes a shield exit portion (also called a shield orifice) that permits the plasma jet to pass therethrough. The shield can be mounted co-axially with respect to the nozzle such that the plasma exit portion is aligned with the shield exit portion.

Arc stability has been a limitation on plasma arc cutting systems. In particular, maximum severance thickness, cutting speed, and arc stability through corners and crossing kerfs present can negatively affect the quality of workpiece processing, for example, by creating an uneven (i.e., rough) processed surface. A known method of improving arc stability can be achieved by coaxial shield flow designs, for example, as described in U.S. Pat. No. 6,207,923 to Lindsay (and assigned to Hypertherm, Inc. of Hanover, N.H.). Coaxial shield flow designs generally use an axially directed column of shield gas to surround a plasma jet. The column of shield gas can be created by an extended nozzle tip disposed within a funnel-shaped shield.

FIGS. 1A-1B depict a configuration that can provide a column of shield gas using coaxial shield flow designs. FIG. 1A shows a torch 100 including an electrode 105 mounted in a spaced relation with a nozzle 110 to form a plasma chamber 115 therebetween along the longitudinal axis A. A shield 120 is mounted relative to the nozzle 110 such that a gas passageway 125 is formed therebetween. The nozzle 110 defines a plasma exit portion 130 through which the ionized plasma jet (not shown) is ejected from the torch. The shield 120 defines a shield exit portion 135 that is substantially coaxial with the plasma exit portion 130. A secondary gas (not shown) flows through the gas passageway 125 and exits the torch 100 via the shield exit portion 135 to form a column of secondary gas about the plasma jet. The shield 120 also defines a plurality of exit holes 140. Some secondary gas passes through the holes 140 during operation of the torch 100. This secondary gas prevents spatter from the workpiece from accumulating on the shield 120 or nozzle 110 and/or moves molten metal away from the plasma jet.

Nozzles 110 and shields 120 of this design show marked improvement in cutting speeds, arc stability, and piercing capacity over previous configurations. However, coaxial shield flow designs have failed in water-cooled plasma arc torch systems operating over approximately 260 Amps and in air-cooled plasma arc torch systems operating over about 100 Amps. Reduced performance occurs in part because the extended small diameter tip portion 150 of the nozzle 110 (i.e., the part of the nozzle 110 that extends axially towards the shield exit portion 135) tends to overheat. Overheating can degrade the quality of a cut and cause premature failure of the nozzle 110. Another limitation is the relatively long axial length 155 of the shield exit orifice that is required to establish an axially directed column of shielding gas. The longer axial length 155 generally involves relatively large distances between the nozzle 110 and the workpiece (not shown).

FIG. 1B is a sectional view along the plane 1-1' of the torch 100 of FIG. 1A. FIG. 1B illustrates the origin of the coaxial columns of gas flow. The plasma jet is ejected from the torch 100 via the plasma exit portion 130 of the nozzle 110. The column of gas is generated in the space 160 between an outer surface 165 of the nozzle 110 and an inner surface 170 of the shield exit portion 135 of the shield 120. The difference in diameter between the plasma exit portion 130 and the space 160 allows the secondary gas to enclose the plasma jet.

A particular problem encountered when using a shield gas to improve arc stability occurs when the shield gas impinges on or interferes with the plasma jet itself. In one known configuration, a plasma arc torch includes an electrode and a nozzle mounted in spaced relationship with a shield to form one or more passageways for fluids (e.g., shield gas) to pass through a space disposed between the shield and the nozzle. Plasma gas flow passes through the torch along the torch's longitudinal axis (e.g., about the electrode, through the nozzle, and out through the nozzle exit orifice). The shield gas or other fluid passes through the one or more passageways to cool the nozzle and impinges the ionized plasma gas flow at a 90 degree angle as the plasma gas flow passes through the nozzle exit orifice. As a result of the impingement, the ionized plasma gas flow can be disrupted (e.g., generating instabilities in the plasma gas flow), which may lead to degraded workpiece processing.

SUMMARY

There is a need for enhanced nozzle cooling and improved arc stability that does not lead to premature component failure. Additionally, there is a need to improve arc stability and substantially decrease impingement on the arc by ambient fluid. There is also a need to increase arc stability and reduce the distance between the nozzle and the workpiece to improve cutting of thin workpieces. Increased arc stability can lead to faster workpiece cutting times and thicker workpiece piercing capabilities, both of which can improve productivity of torch operators.

The invention overcomes shortcomings in arc stability by reducing impingement or interference with the arc while also sufficiently cooling the nozzle that leads to extended nozzle life and improved workpiece processing. The invention overcomes shortcomings of known configurations with a new design using grooves, bores, or other flow passages (referred to herein as fluid passageways or gas passageways) disposed, wholly or in part, within or on the nozzle to form discrete jets of a fluid flow adjacent to the plasma jet. The discrete jets can, for example, be formed of a shield gas, plasma gas, secondary gas, or a tertiary gas. The discrete jets can prevent interactions between ambient fluid and the plasma jet. As fluid passes through the passageways, a cooling effect is achieved with respect to the nozzle. Moreover, the discrete jets and the combination of the discrete jets and the plasma jet provide substantially axial momentum to improve the speed and depth of workpiece piercing applications. Sufficient nozzle cooling combined with substantially axial momentum of the jets improves the efficiency and lifetime of other components of the torch as well. The concepts described herein can be employed in different types of plasma arc torches, for example, high-frequency high-voltage torches, transferred arc torches, or contact start torches (e.g., either "blow-forward" or "blow-back" contact start torches).

In one aspect, the invention includes a nozzle for a plasma arc torch. The nozzle includes a rear portion that defines a portion of a plasma chamber and a front portion that includes a first end adjacent the rear portion and a second end that defines a plasma exit portion. One or more fluid passageways are disposed within the front portion and extend from the first end to the second end. The fluid passageways each have a passageway exit portion that provides one or more discrete jets of a secondary fluid disposed about a plasma jet. In some embodiments, the one or more discrete jets collectively surround the plasma jet. In some embodiments, the one or more discrete jets are disposed about the plasma jet to, for example, prevent an ambient fluid from interacting with the plasma jet.

In some embodiments, each of the passageway exit portions are substantially adjacent the plasma exit portion. In some embodiments, the fluid passageways each define a path that generates flow of the discrete jets exiting the passageway exit portions. The flow of the discrete jets can be co-axial with, substantially parallel with, angularly converging to, or angularly diverging from the plasma jet. The angle at which the discrete jets converge toward or diverge from the plasma jet varies based on, for example, the particular processing application and the arc stability desired therefor. The rear portion and the front portion can be integrally formed. The one or more fluid passageways can include a plurality of fluid passageways that form a radial arrangement about the plasma exit portion.

The front portion can include a relief flat that is disposed along a side of each of the fluid passageways to increase the amount of the secondary fluid flow that enters into the fluid passageways. The secondary fluid can swirl through the fluid passageways. The fluid passageways can impart a swirling motion to the secondary fluid. In some embodiments, the rear portion includes a securing mechanism to secure the nozzle to a plasma torch body. The front and rear portions of the nozzle can be formed from an electrically conductive material.

In some embodiments, the nozzle includes a circumscribing component that defines an interior surface and an exterior surface. The circumscribing component can be mounted relative to the front portion such that at least a portion of the interior surface cooperates with the front portion to form the one or more fluid passageways. The interior surface of the circumscribing component can define one or more discrete fluid passageways that correspond to the one or more fluid passageways disposed on the front portion of the nozzle.

In some embodiments, the nozzle includes a circumscribing component that defines an interior surface and an exterior surface. The circumscribing component can be mounted relative to the front portion of the nozzle such that at least a portion of the interior surface cooperates with the front portion to form a secondary fluid passageway. A secondary fluid can flow through the secondary fluid passageway independently of a plasma gas that flows through the plasma chamber or a shielding gas that flows over the exterior surface of the circumscribing component. In some embodiments, each of the one or more fluid passageways provide a discrete path for the secondary fluid. In some embodiments, the plasma arc torch is a transferred arc plasma arc torch.

In another aspect, the invention includes a shield. The shield can protect the nozzle of a plasma arc torch. The shield includes a shield body that defines a shield exit portion and also has an exterior portion and an interior portion. The interior portion can include an angular kink that diverts a fluid into a fluid passageway disposed within the nozzle. In some embodiments, the interior portion of the shield body includes one or more angular kinks to divert a fluid into one or more corresponding fluid passageways disposed within the nozzle.

In another aspect, the invention features a shield for a plasma arc torch. The shield includes a shield body defining a shield exit portion and having an exterior portion and an interior portion. The interior portion of the shield body includes one or more fluid passageways that each have a passageway exit portion that provide one or more discrete jets of a secondary fluid disposed about a plasma jet.

In another aspect, the invention includes a torch tip for a plasma arc torch, and the tip has a longitudinal axis. The torch tip includes a nozzle that has a rear portion that defines at least a portion of a plasma chamber and a front portion. The front portion includes a first end that is disposed adjacent the rear portion and a second end that defines a plasma exit portion. One or more fluid passageways are disposed within the front portion, and each of the fluid passageways extends from the first end to the second end. Each of the fluid passageways has a passageway exit portion that provides a discrete jet of a secondary fluid disposed about a plasma jet. The torch tip includes a shield having a shield body that defines a shield exit portion and also has an exterior portion and an interior portion. The shield is mounted in a spaced relation with respect to the nozzle and relative to the longitudinal axis of the torch tip such that a secondary passageway is formed between the shield and the nozzle. In some embodiments, the interior portion includes one or more angular kinks for diverting a gas into the one or more fluid passageways.

In some embodiments, the fluid passageways are disposed within the front portion of the nozzle and include a passageway exit portions that are disposed substantially adjacent the plasma exit portion of the nozzle.

In another aspect, the invention features a method. The method involves generating a plasma jet that exits a plasma arc torch from a plasma exit portion of a nozzle that is detachably mounted to a torch body. The method involves forming one or more discrete jets of a secondary fluid from passageway exit portions of one or more fluid passageways disposed at least in part on the nozzle or a shield mounted on the torch substantially coaxially with the nozzle. The discrete jets are disposed about a longitudinal axis of the plasma jet. In some embodiments, the method involves reducing interactions between ambient fluid and the plasma jet. The ambient fluid can include environmental air, ambient air, or a liquid. In some embodiments, the discrete jets are radially disposed about the longitudinal axis. In some embodiments, the method involves improving the axial momentum of the discrete jets, the plasma jet or both.

In another aspect, the invention features a torch tip for a plasma torch, and the torch tip includes a nozzle having a rear portion that defines at least a portion of a plasma chamber and a front portion. The front portion includes a first end disposed adjacent the rear portion, a second end that defines a plasma exit portion, and at least a portion of one or more discrete fluid pathways disposed on the front portion and that extend from the first end to the second end. The torch tip also includes a circumscribing component that defines an interior surface and an exterior surface. The circumscribing component is mounted relative to the nozzle such that at least a portion of the interior surface cooperates with the front portion of the nozzle to form one or more fluid passageways for generating one or more discrete jets of a secondary fluid. In some embodiments, the interior surface of the circumscribing component defines a portion of one or more discrete fluid passageways that correspond to the one or more discrete fluid pathways that are disposed on the front portion of the nozzle. In some embodiments, the torch tip includes a sealing component disposed between the nozzle and the interior surface of the circumscribing component.

In another aspect, the invention features a torch tip for a plasma arc torch. The tip includes a nozzle that has a rear portion that defines at least a portion of a plasma chamber and a front portion that defines a plasma exit portion. The tip also includes a means for generating one or more discrete jets of a secondary fluid disposed about a plasma jet exiting the torch from the plasma exit portion. The tip includes a circumscribing means mounted relative to the nozzle and defining a fluid exit portion that permits the discrete jets to exit the torch tip. The circumscribing means can be, for example, a shield mounted to the torch, a coating or plating applied to the nozzle, a shell cap that cooperates to form a portion of the nozzle, or a sealing component. The means for generating the discrete jets can be, for example, fluid passageways having fluid passageway exit portions disposed about a plasma exit portion. The fluid passageways and the fluid passageway exit portions can be disposed in the nozzle, the circumscribing means, or a combination of the two. In some embodiments, the fluid passageways are defined by a component that is not the nozzle or the circumscribing means.

In another aspect, the invention features a plasma arc torch. The torch includes an electrode that has an exterior surface that defines a portion of a plasma chamber. The torch includes a nozzle that is detachably mounted to a torch body. The nozzle includes a rear portion defining at least a portion of the plasma chamber and a front portion. The torch includes a means for generating one or more discrete jets of a secondary fluid. The discrete jets are disposed about a plasma jet exiting the plasma exit portion of the nozzle. The torch includes a shield that is mounted to a retaining cap that is secured to the torch body. The shield defines a shield exit portion that is substantially aligned with the plasma exit portion to permit the plasma jet and the discrete jets to exit the torch. The torch also includes a swirl ring that is mounted relative to the torch body. The swirl ring imparts a swirling motion to at least one of a plasma gas, a secondary gas, or a tertiary gas within the torch. In any of the aspects or embodiments described herein, the plasma arc torch can be a transferred arc plasma arc torch.

In any of the aspects or embodiments described herein, the plasma arc torch can be a non-transferred arc plasma arc torch.

In such embodiments, the invention provides advantageous features such as improved cooling of the torch nozzle and/or circumscribing components such as shields. Other beneficial features include an increased useful life of the nozzle, increased axial momentum of flowing fluids, and increased arc stability. Increased arc stability and/or increased axial momentum can lead to faster (e.g., high-speed) cutting of workpieces and thicker workpiece piercing capability among other benefits. Increased arc stability can reduce surface roughness and waviness of workpieces processed during plasma arc torch operations. Some embodiments of the invention reduce noise associated with plasma arc torch operations, particularly noise generated by the plasma arc. The described features improve the productivity of plasma arc torch operators by allowing faster, higher-quality, and more efficient workpiece processing.

BRIEF DESCRIPTION OF THE DRAWINGS

The foregoing discussion will be understood more readily from the following detailed description of the invention taken in conjunction with the accompanying drawings.

DETAILED DESCRIPTION

Figure 2A:
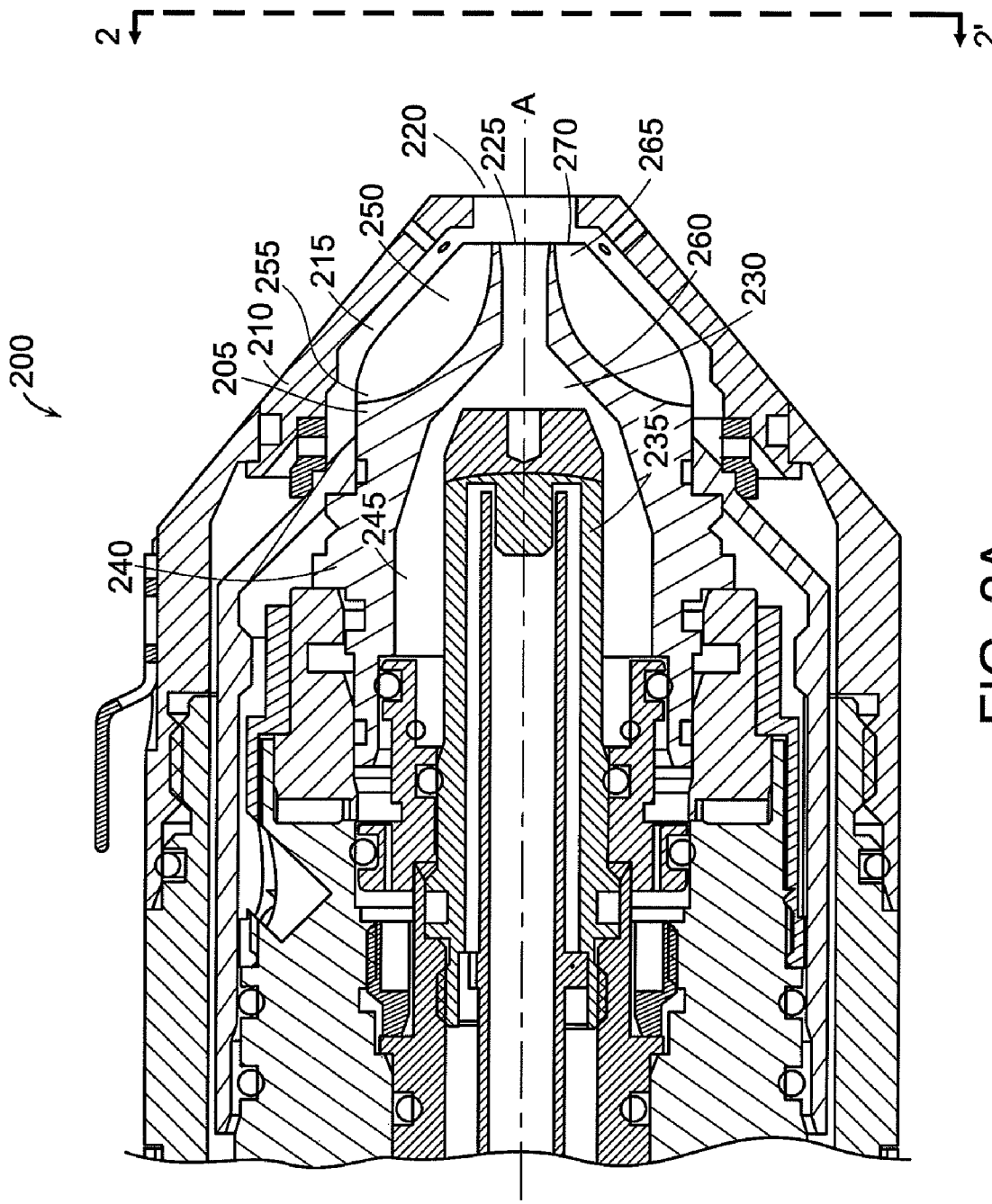
FIGS. 2A-2B depict an exemplary embodiment of the invention featuring gas passageways disposed within the nozzle.

FIG. 2A depicts an exemplary embodiment fluid passageways disposed within the nozzle in accordance with the invention. FIG. 2 illustrates a torch tip 200 including a nozzle 205 having a shield 210 mounted in a co-axial spaced relationship relative to longitudinal axis A. Both the nozzle 205 and the shield 210 can be formed of electrically conductive materials. In some embodiments, the nozzle 205 and the shield 210 are formed of the same electrically conductive materials. In other embodiments, the nozzle 205 and the shield 210 are made of different electrically conductive materials. Examples of electrically conductive materials suitable for use in the torch tip 200 include but are not limited to copper, aluminum, or brass. In the illustrated embodiment, the nozzle 205 and the shield 210 are mounted in a spaced relationship with a secondary fluid passageway 215 disposed therebetween.

During workpiece processing, a fluid, such as a secondary gas, can pass along a secondary fluid passageway 215 and can ultimately be discharged from the torch tip 200 through a shield exit portion 220 defined by the shield 210 and substantially co-axially aligned with an exit portion 225 of the nozzle 205. In plasma arc applications, an arc (not shown) is formed in the space 230 between an electrode 235 (e.g., a cathode) and the nozzle 205 (e.g., an anode) by establishing a relative electrical potential between the electrode 235 and the nozzle 205. In the illustrated embodiment, the nozzle 205 includes a rear portion 240 that forms at least a portion of a plasma chamber 245. The electrode 235 cooperates with the rear portion 240 of the nozzle 205 to form at least a portion of the plasma chamber 245 therebetween. After the arc is formed, a plasma gas (not shown) is supplied to the plasma chamber 245. The plasma gas is ionized by the electric potential between the electrode 235 and the nozzle, and the arc is transferred from the nozzle 205 to a workpiece (not shown). Operation of the torch 200 when the arc has moved from the nozzle 205 to the workpiece is known as transferred arc mode.

The nozzle 205 includes a front portion 250 that has a first end 255 disposed adjacent the rear portion 240. In the illustrated embodiment, the nozzle 205 includes several fluid passageways 260 disposed within the front portion 250 of the nozzle 205 and extending from the first end 255 to a second end 265 of the front portion 250 that defines the nozzle exit portion 225.

As a fluid (not shown) flows through the secondary fluid passageway 215, some of fluid passes into the fluid passageways 260. The fluid passes through the fluid passageways 260, and exits the torch tip 200 through the shield exit portion 220. Each fluid passageway 260 includes a passageway exit portion 270. As the fluid exits the fluid passageways 260 via the passageway exit portions 270, a discrete jet (not shown) of secondary gas is formed. In the illustrated embodiment, such discrete jets of secondary gas surround a plasma jet (not shown) exiting the nozzle exit portion 225. The discrete gas jets protect and stabilize the plasma jet by reducing entrainment of an ambient fluid or secondary gas into the plasma jet. In some embodiments, the fluid passageways 260 or the passageway exit portions 270 can be oriented such that the discrete jets of secondary gas converge towards or diverge from the plasma jet with respect to axis A. In some embodiments, the discrete gas jets coaxially surround the plasma jet. The discrete gas jets hinder interactions between an ambient fluid and the plasma jet.

Figure 2B:
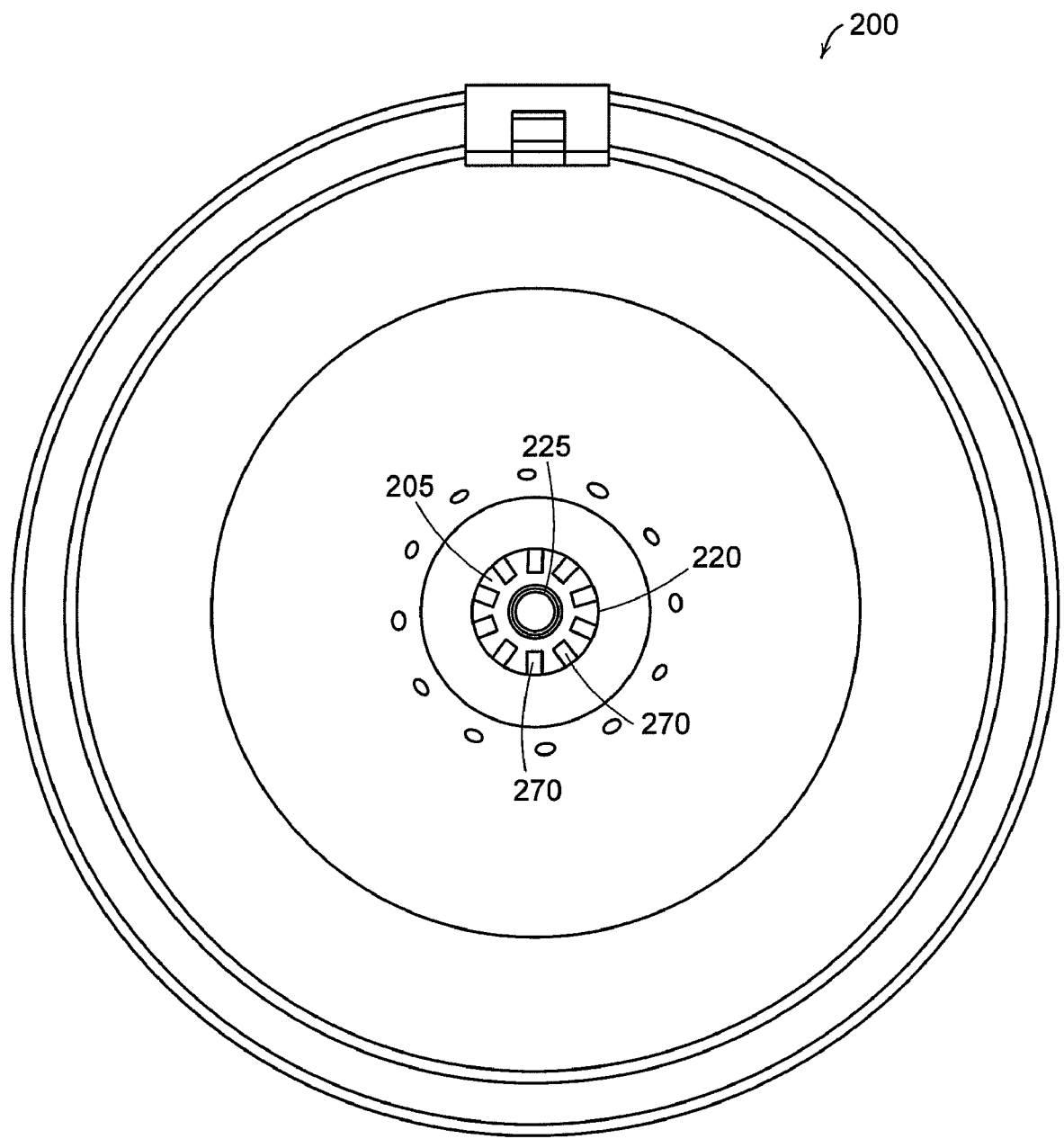

FIG. 2B depicts a sectional view along the plane 2-2' of the torch tip 200 of FIG. 2A. FIG. 2B illustrates the origin of the discrete gas jets. The plasma jet is ejected from the torch tip via the plasma exit portion 225 of the nozzle 205. The discrete gas jets are generated by a secondary gas exiting the torch tip 200 via the passageway exit portions 270 through the shield exit portion 220. In some embodiments, the passageway exit portions 270 cooperate with the shield exit portion 220 to form the discrete gas jets.

Figure 3A:
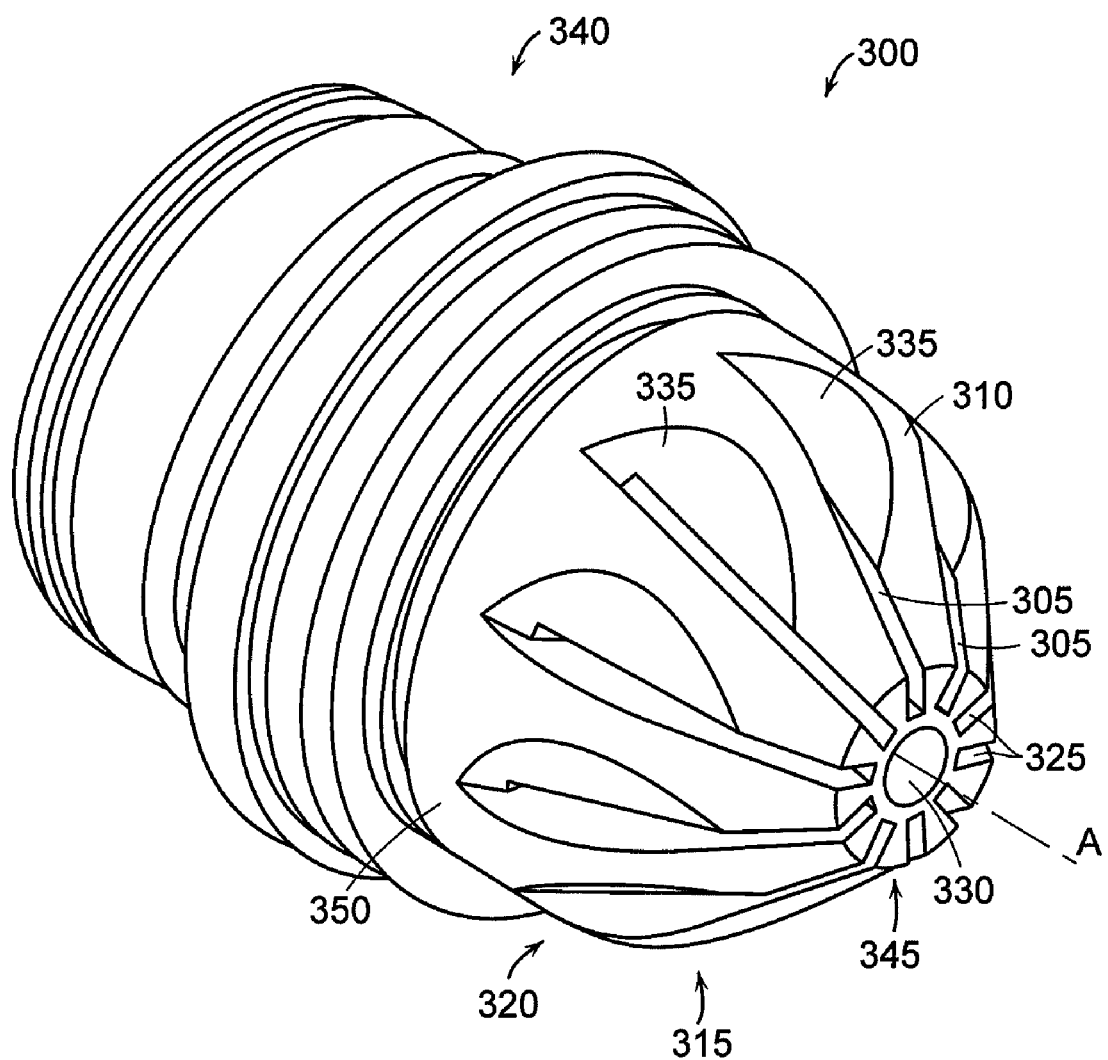
FIGS. 3A-3B depict an embodiment of a nozzle including a relief flat.

FIG. 3A is a perspective view of a nozzle including a relief flat. The nozzle 300 includes a plurality of fluid passageways 305 disposed in an outer surface 310 of the nozzle 300. As illustrated, the fluid passageways 305 include grooves disposed within the front portion 315 of the nozzle 300 near an upstream portion 320 of the fluid passageways 305. Passageway exit portions 325 are disposed adjacent to and radially arranged about a nozzle exit portion 330. The nozzle 300 includes relief flats 335 disposed along the fluid passageways 305, e.g., at an upstream portion 320 of one or more of the fluid passageways 305. The relief flats 335 can be configured to increase the flow area available to a fluid supplied from a fluid supply, e.g., the secondary fluid passageway 215 of FIG. 2A. The additional flow area reduces the flowing back pressure at this location in the secondary fluid passageway 215, thereby increasing velocity of the secondary gas and inducing additional gas flow. The relief flats 335 can act as aerodynamic "scoops" or "fins" that increase the amount of fluid flow into the fluid passageways 305.

In some embodiments, the fluid passageways 305 are oriented at various angles relative to the longitudinal axis A. For example, the fluid passageways 305 can be pitched at approximately 11° with respect to axis A. Such a pitch or angle can impart a swirling or screw-like motion to the fluid (e.g., the secondary or shield gas) and can improve the quality of cut edges or kerfs in the workpiece being processed. Also, the fluid passageways 305 can be pitched at a relative angle with respect to the plasma jet such that the discrete jets can converge towards or diverge from the plasma jet.

The nozzle 300 also includes a rear portion 340. The fluid passageways 305 extend from a first end 345 of the front portion 315 to a second end 350 of the front portion 315. In some embodiments, the front portion 315 is integrally formed with the rear portion 340 (e.g., the front portion 315 and the rear portion 340 are manufactured from the same piece of material). In some embodiments, the front portion 315 and the rear portion 340 are not integrally formed. For example, the front portion 315 and the rear portion 340 can be made from different materials or different pieces of material. The front portion 315 and the rear portion 340 can then be assembled (e.g., by a friction or threaded fit). Such a configuration is within the scope of the invention. Moreover, additional components are contemplated, for example, a component (not shown) axially toward to rear portion 340 can be used to direct a secondary gas toward the fluid passageways 305 before the gas flow approaches the front portion 315. Such a configuration is within the scope of the invention.

Figure 3B:
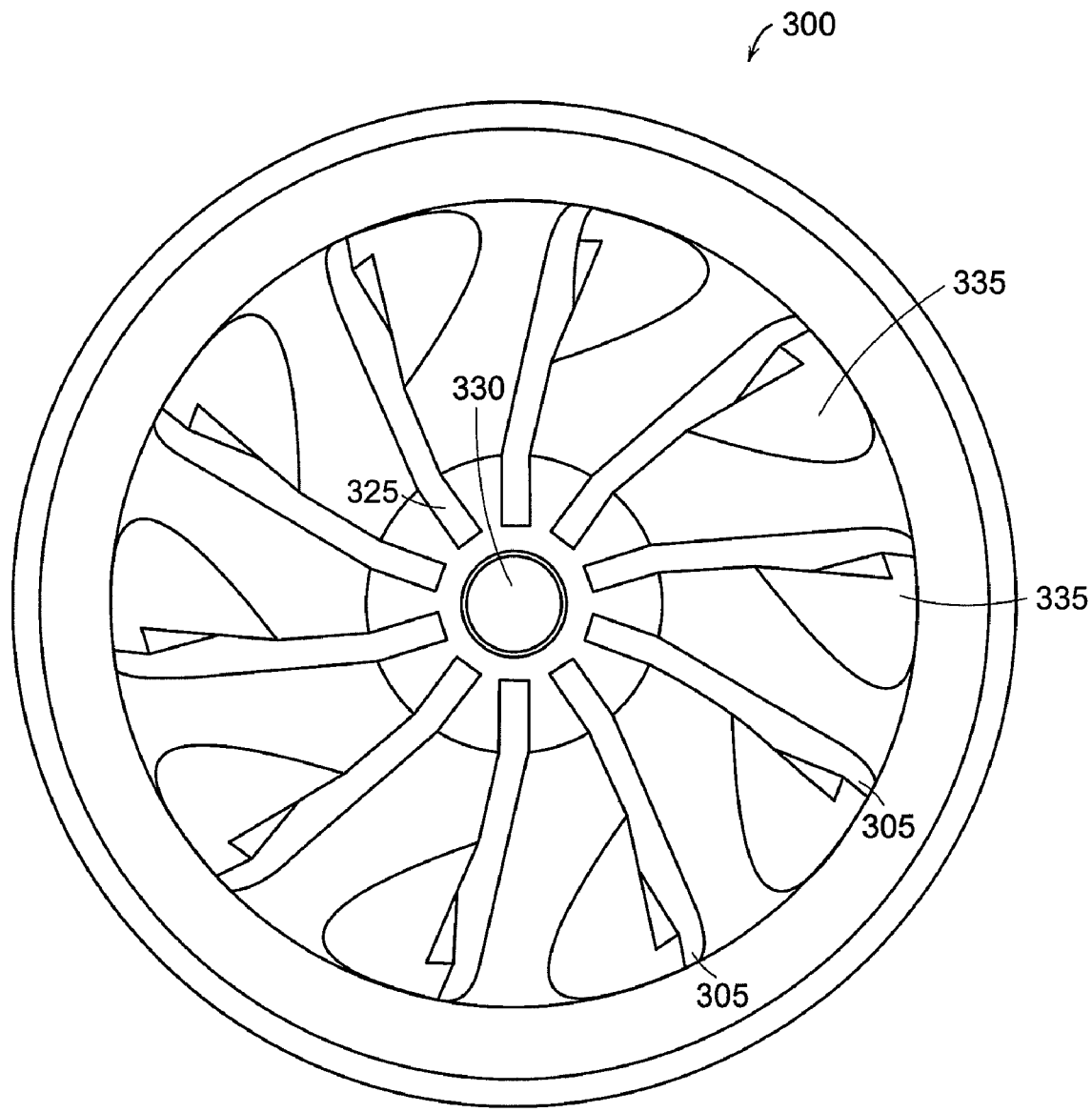

FIG. 3B is an end view of the nozzle 300 of FIG. 3A. The additional flow area created by the relief flats 335 adjacent the fluid passageways 305 is shown. Moreover, the relative proximity of the passageway exit portions 325 to the plasma exit portion 330 is clearly depicted. In some embodiments, passageway exit portions 325 that are relatively close to the plasma exit portion 330 allow a transferred arc torch to operate at lower currents. Lower operating currents increase the operation lifetime of the nozzle 300.

Figure 4:
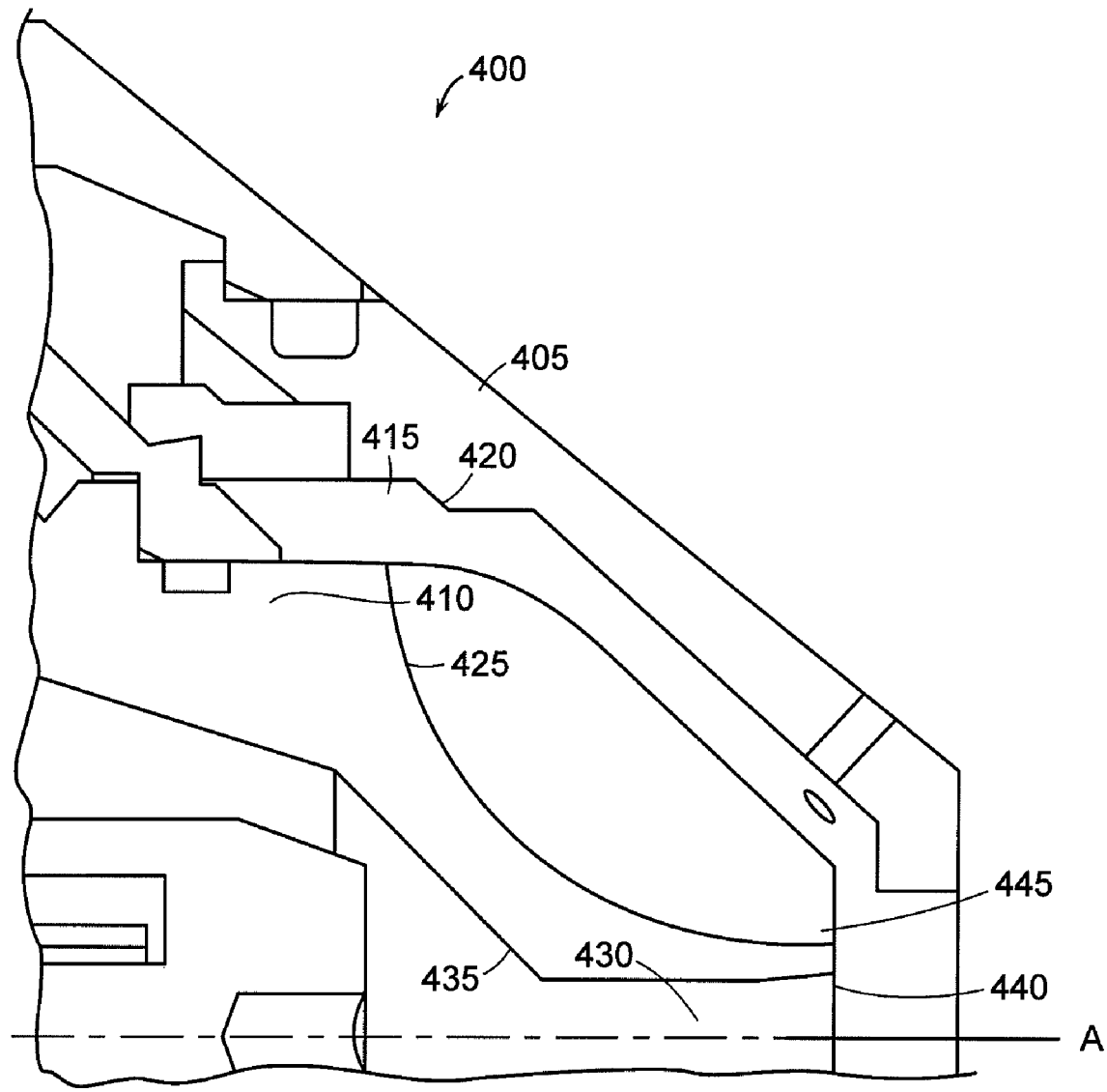
FIG. 4 illustrates a shield for a plasma arc torch including an angular kink for directing a secondary gas into fluid passageways.

FIG. 4 illustrates a shield for a plasma arc torch including an angular kink for directing a secondary gas into fluid passageways. The torch tip 400 includes a shield 405 and a nozzle 410. The shield 405 is mounted in a spaced relation to the nozzle 410 relative to the longitudinal axis A such that a secondary gas passage 415 is disposed therebetween. In some embodiments, the nozzle 410 is the nozzle 205 of FIG. 2A or the nozzle 300 of FIGS. 3A & 3B. The shield 405 includes an angular kink 420 to direct fluid that is flowing through the secondary gas passage 415 into the fluid passageways 425. Similar to the relief flats 335 of FIGS. 3A & 3B, the angular kink 420 can alter the flow path of the secondary fluid passageway 415. The additional flow area can reduce the flowing back pressure at this point, which thereby increases the velocity of the gas and induces additional gas flow into the fluid passageway 425. In some embodiments, the angular kink 420 defines a continuously annular region of the shield 410 about the longitudinal axis A. In other embodiments, the angular kink 420 is discretely disposed radially about the longitudinal axis A. Discretely-disposed angular kinks 420 can be disposed in radial or coaxial alignment with fluid passageways 425, but this is not required.

Some embodiments of torch tips 400 feature the relief flats 335 of FIGS. 3A & 3B in combination with the angular kinks 420 of FIG. 4, thereby further increasing fluid flow into the fluid passageways 425. Increased fluid flow in the fluid passageways 425 increases the effectiveness of the discrete jets that surround the plasma jet. An advantageous feature of the embodiments of FIGS. 3A & 3B and FIG. 4 includes faster workpiece cutting and thicker workpiece piercing. One method for further improving workpiece processing includes increasing the length of a bore 430 defined by the nozzle 410. The bore 430 is the portion of the nozzle 410 that axially extends from an interior surface 435 of the nozzle 410 to the plasma exit portion 440. Increasing the length of the bore 430 improves the length-to-diameter ratio of this portion of the nozzle and increases the heat conduction area of the nozzle 410 while also increasing the potential for convective cooling of the nozzle tip 445 by the fluid, leading to longer operational life of the nozzle. By disposing fluid passageways 425 within the nozzle 410, both heat conduction area and convective cooling effects are increased.

Figure 5A:
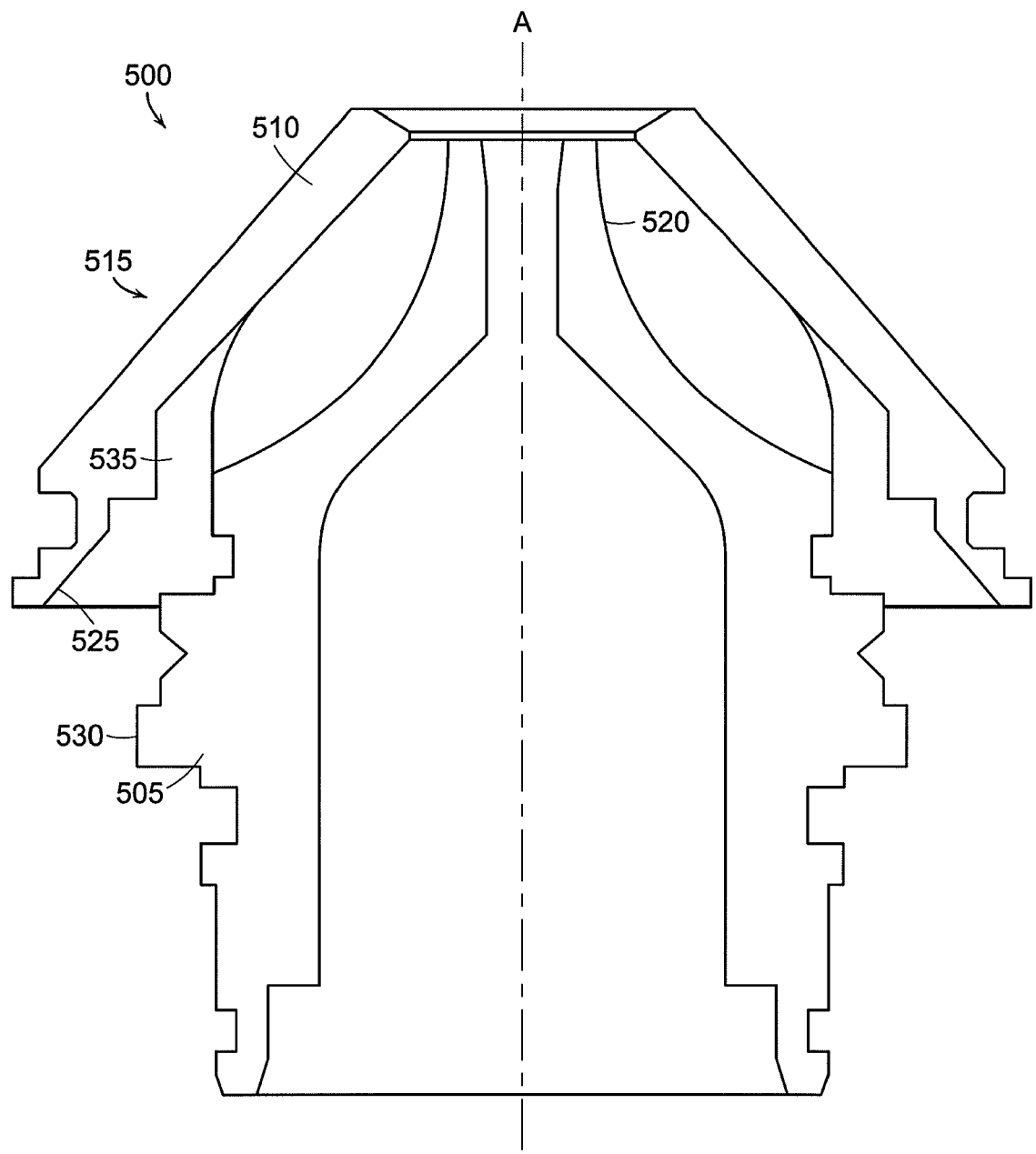
FIGS. 5A-5C depict an embodiment of a torch tip including a circumscribing component forming a part of fluid passageways.
Figure 5B:
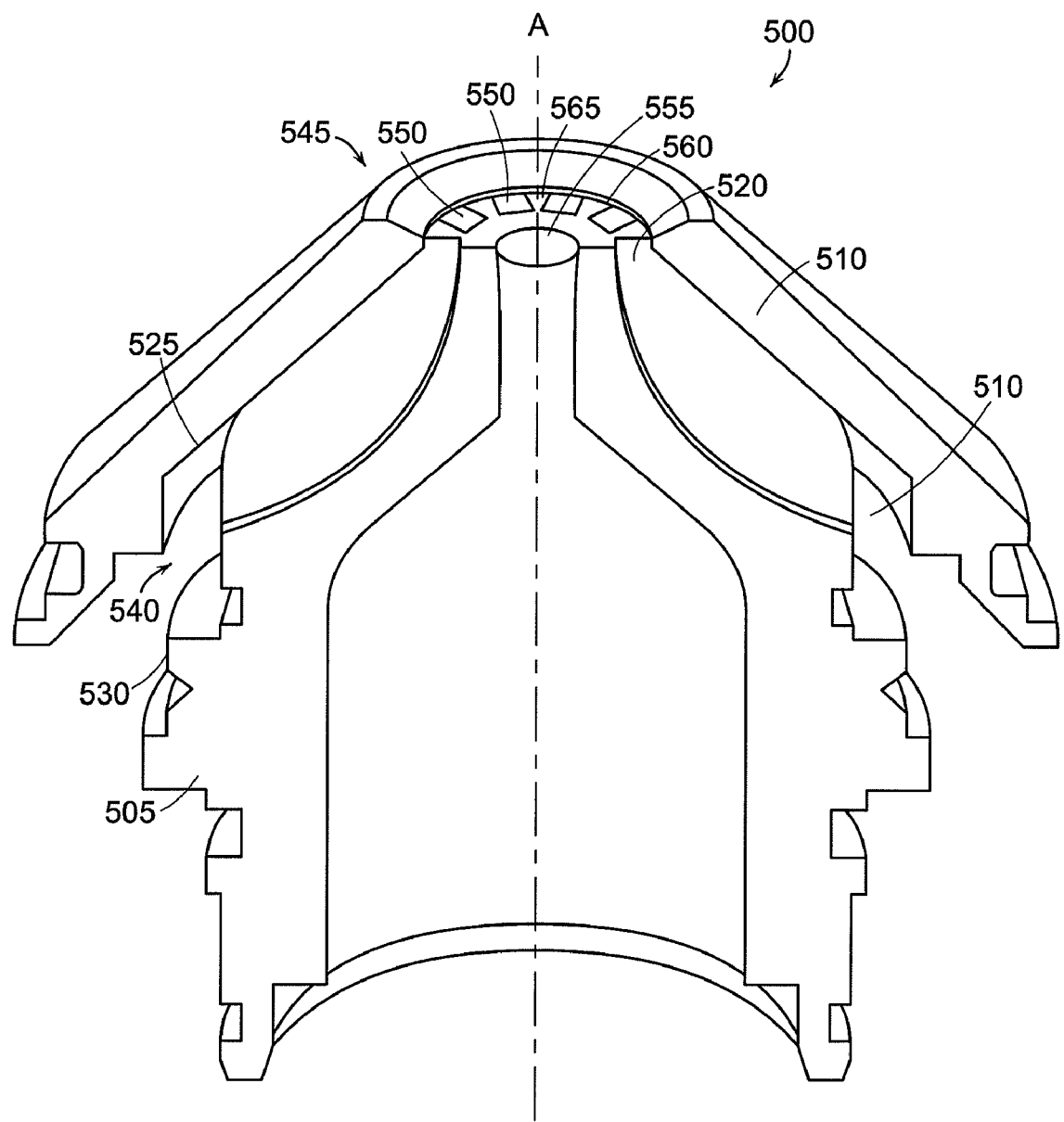
Figure 5C:
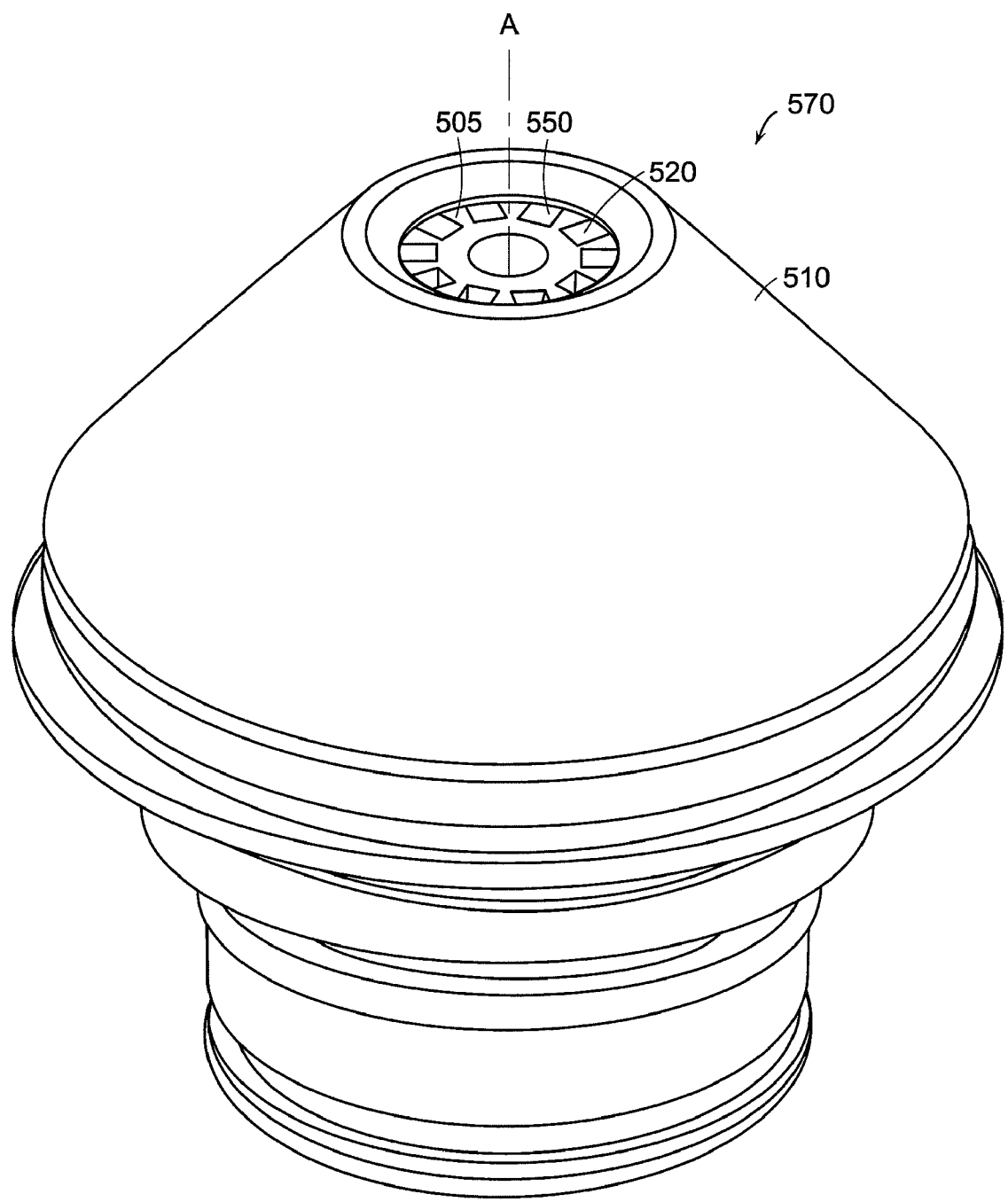

FIGS. 5A-5C depict an embodiment of a torch tip including a circumscribing component forming a part of fluid passageways. FIG. 5A is a cross-sectional view of a torch tip 500. The torch tip includes a nozzle 505 and a circumscribing component 510 in physical contact or abutting relationship with a front portion 515 of the nozzle 505. The circumscribing component 510 is generally not mounted in a spaced relation with the nozzle relative to the longitudinal axis A. The front portion 515 of the nozzle 505 includes fluid passageways 520. An interior surface 525 of the circumscribing component 510 cooperates with an outer surface 530 of the nozzle 505 to form a secondary fluid passage 535. The interface 540 between the interior surface 525 of the circumscribing component 510 and the outer surface 530 of the nozzle provides a fluid seal in the secondary fluid passage 535. The fluid seal creates a pressure drop between the secondary fluid passage 535 and the fluid passageways 520, which increases flow of a fluid into the fluid passageways 520.

FIG. 5B is a perspective cross-sectional view of the torch tip of FIG. 5A. The interior surface 525 of the circumscribing component 510 cooperates with the outer surface 530 of the nozzle 505 to form two-sided fluid passageways 520 for creating discrete jets (not shown) of a secondary gas about the plasma jet (not shown). The interior surface 525 of the circumscribing component and the fluid passageways 520 form an enclosed pathway for secondary gas to travel from the first end 540 of the nozzle 505 to the second end 545 of the nozzle 505. The secondary gas exits the second end 545 of the nozzle via passageway exit ports 550 to form discrete gas jets. The plasma jet exits the torch tip 500 via the plasma exit portion 555. The exit portion 560 of the circumscribing component 510 cooperates with an end surface 565 of the nozzle 510 to form the passageway exit portions 550.

An advantageous feature of the configuration of FIGS. 5A-5C is that relatively more fluid flows through the fluid passageways 520 and ultimately from the passageway exit portions 550. Increased fluid flow through the fluid passageways 520 occurs because no alternate flow path exists for the secondary fluid (e.g., for the fluid to exit the torch). More particularly, substantially all of the gas flow occurs through the resulting fluid passageways 520.

FIG. 5C illustrates a perspective view of the torch tip 500 of FIGS. 5A & 5B. In some embodiments, the circumscribing component 510 includes portions of fluid passageways (not shown) that correspond to portions of fluid passageways 520 disposed on the nozzle 505. For example, the circumscribing component 510 can include grooves (not shown) that correspond to the fluid passageways 520 disposed on the nozzle 510. An advantage of grooves in the circumscribing component 510 is additional gas flow area in the upstream portion 570 of the nozzle 510 leading to higher gas velocity when the discrete jets leave the passageway exit portions 550. For example, the nozzle 505 and circumscribing component 510 can each define an equal number of half-passageways such that mounting the circumscribing component 510 in abutting engagement with the nozzle 505 forms the equal number of two-sided passageways by cooperation.

Figure 6A:
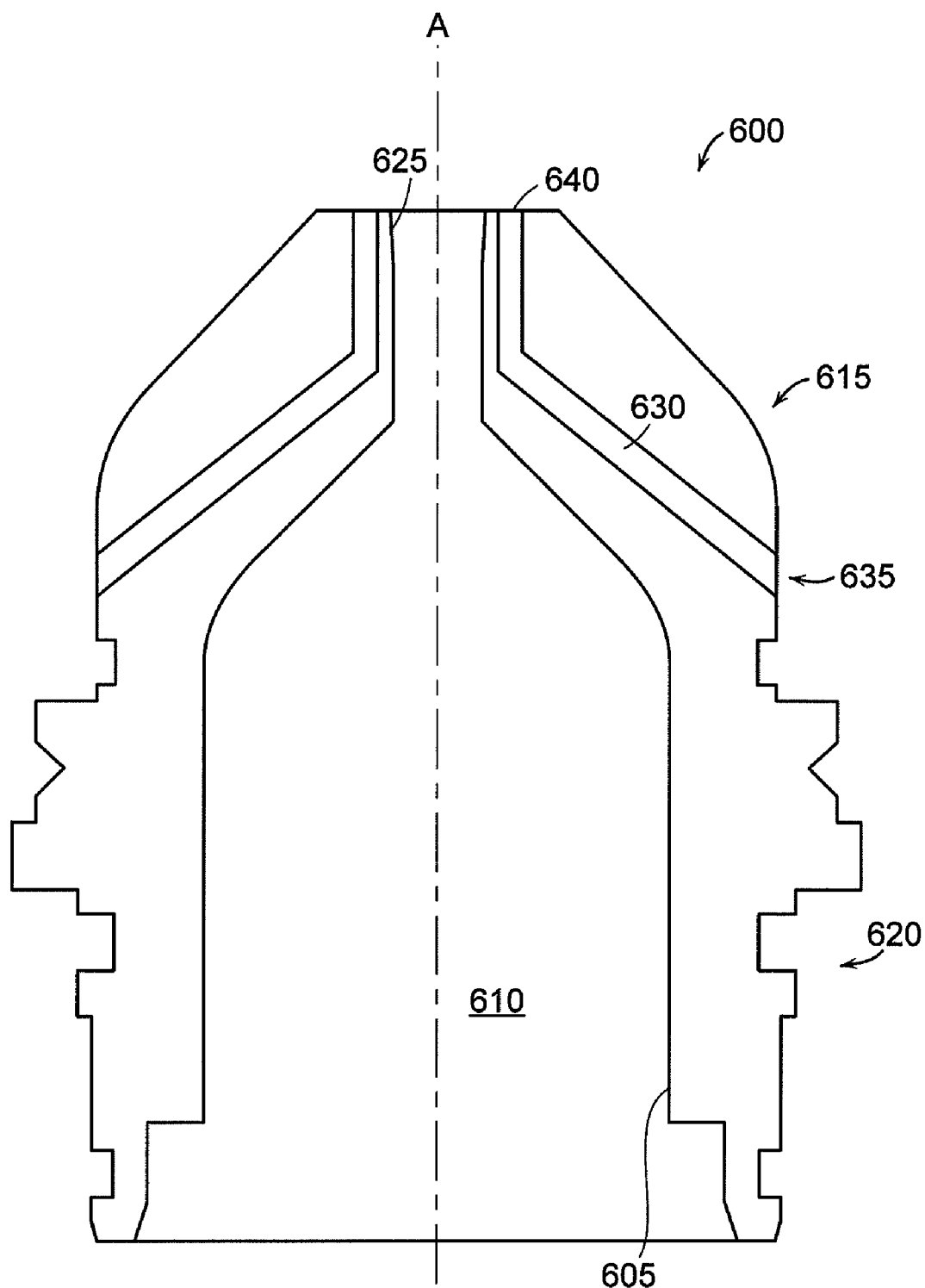
FIGS. 6A-6C depict an embodiment of a nozzle including fluid passageways disposed within the nozzle.
Figure 6B:
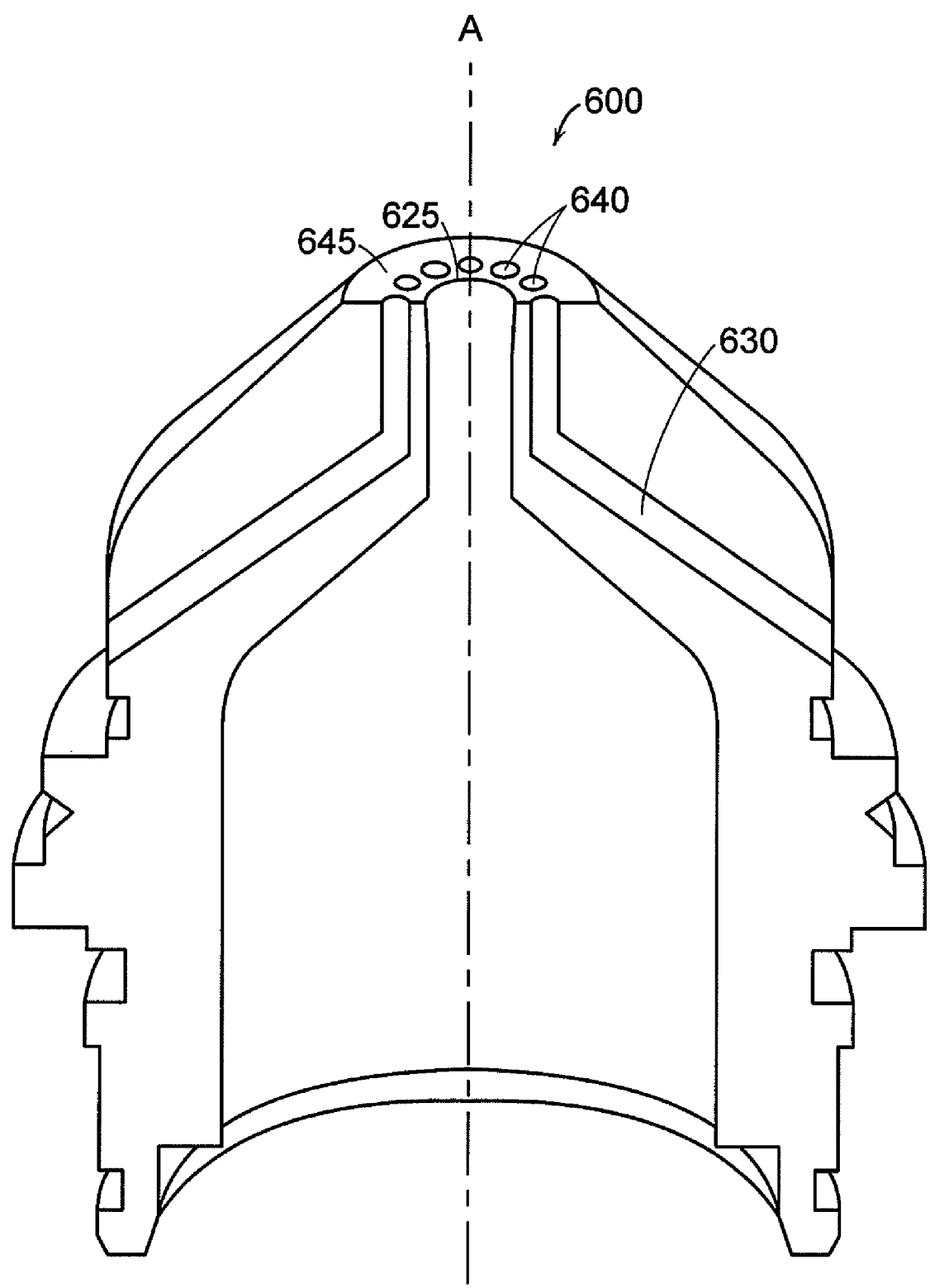
Figure 6C:
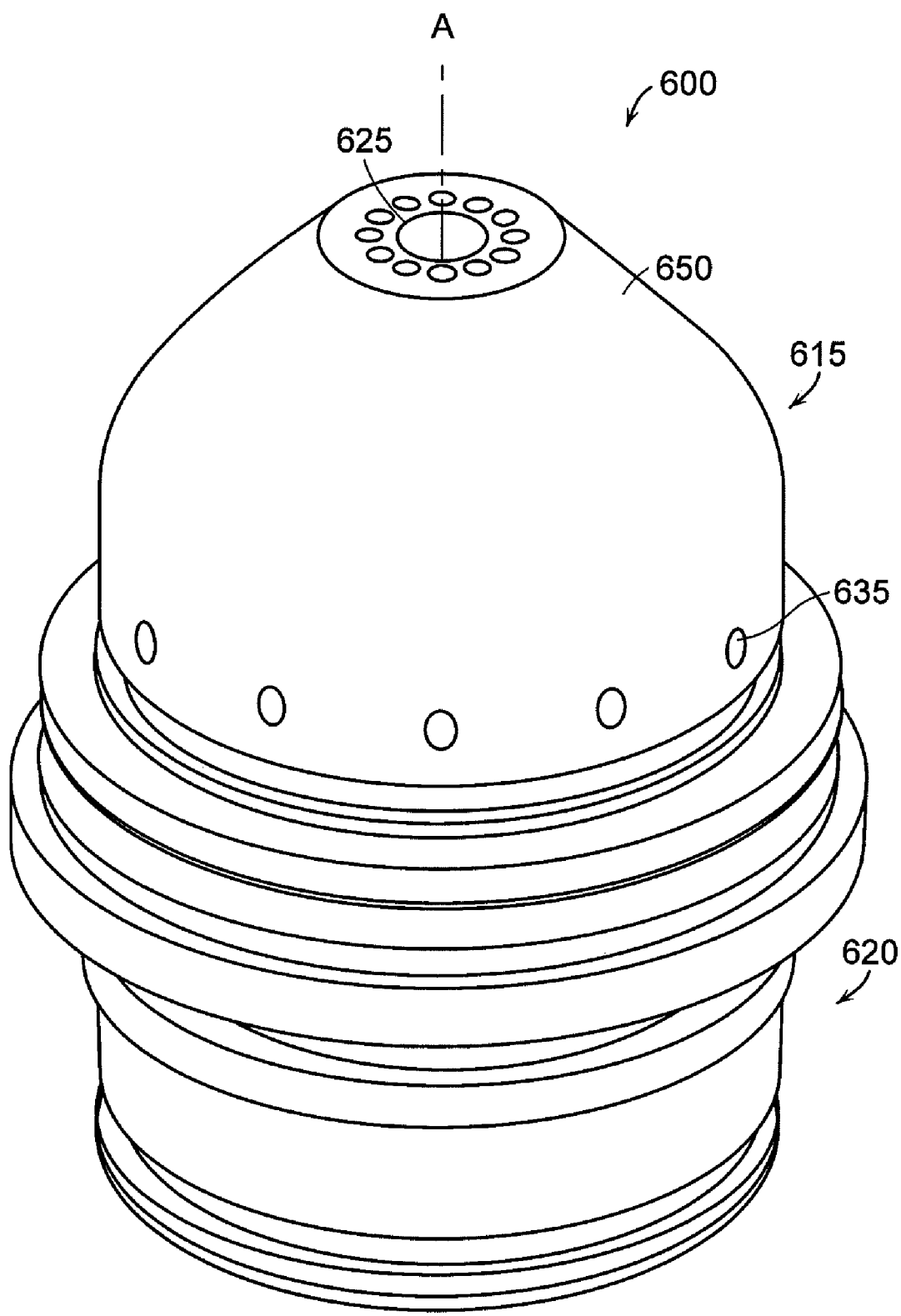

FIGS. 6A-6C depict a nozzle including fluid passageways formed in the nozzle. FIG. 6A is a cross-sectional view of a nozzle 600. An interior surface 605 of the nozzle 600 defines a portion of a plasma chamber 610. The nozzle 600 includes a front portion 615 and a rear portion 620. The interior surface 605 of the nozzle 600 defines a plasma exit portion 625 through which a plasma jet is ejected from a plasma arc torch (not shown) along the longitudinal axis A. The nozzle 600 also includes fluid passageways 630 disposed within the front portion 615 of the nozzle 600. The fluid passageways 630 extend from a secondary gas entry point 635 to a passageway exit portion 640 disposed near the plasma exit portion 625. In some embodiments, the fluid passageways 630 are bores passing through the material from which the nozzle 600 is formed (e.g., the fluid passageways 630 are closed paths or channels passing through the nozzle 600).

FIG. 6B is a perspective cross-sectional view of the nozzle 600 of FIG. 6A. An advantageous feature of the nozzle in FIGS. 6A-6C includes that the passageway exit portions 640 are formed entirely by the material from which the nozzle 600 is formed. More particularly, the passageway exit portions 640 are defined by the end surface 645 of the nozzle 600 adjacent the plasma exit portion. No additional components are required to form discrete gas jets (e.g., a shield or circumscribing component is not required to form the fluid passageways 630). Moreover, fluid passageways 630 that are formed in the nozzle 600 allow positioning of the passageway exit portions 640 relatively closer to the plasma exit portion 625, which is beneficial for low-current operations.

FIG. 6C is a perspective view of the nozzle 600 of FIGS. 6A & 6B. In some embodiments, a circumscribing component 650 is disposed about the nozzle 600 for insulative or sealing purposes and to prolong the life of the nozzle 600. As illustrated the circumscribing component 650 extends from the front portion 615 (e.g., the plasma exit orifice 625) to the rear portion 620 of the nozzle 600 (e.g., axially rearward of the gas entry points 635). In some embodiments, the circumscribing component 650 does not extend past the gas entry points 635. The circumscribing component 650 can prevent slag from impacting or accumulating on the nozzle 600. In addition, a circumscribing component 650 with a relatively small thickness permits the nozzle 600 to be positioned in closer operative proximity to the workpiece (not shown) than a traditional shield would.

Figure 7A:
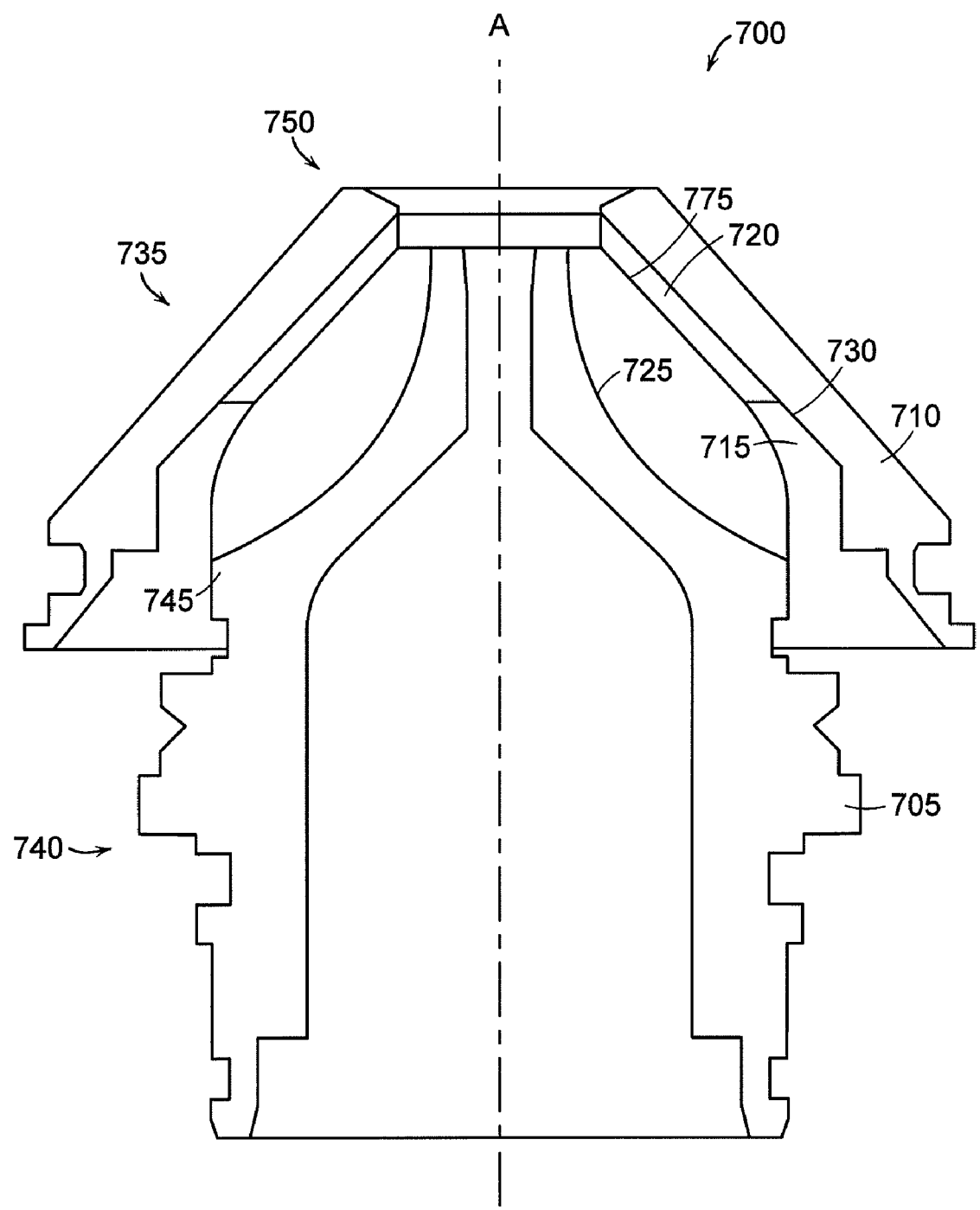
FIGS. 7A-7C illustrate an exemplary embodiment of a torch tip including a sealing component.
Figure 7B:
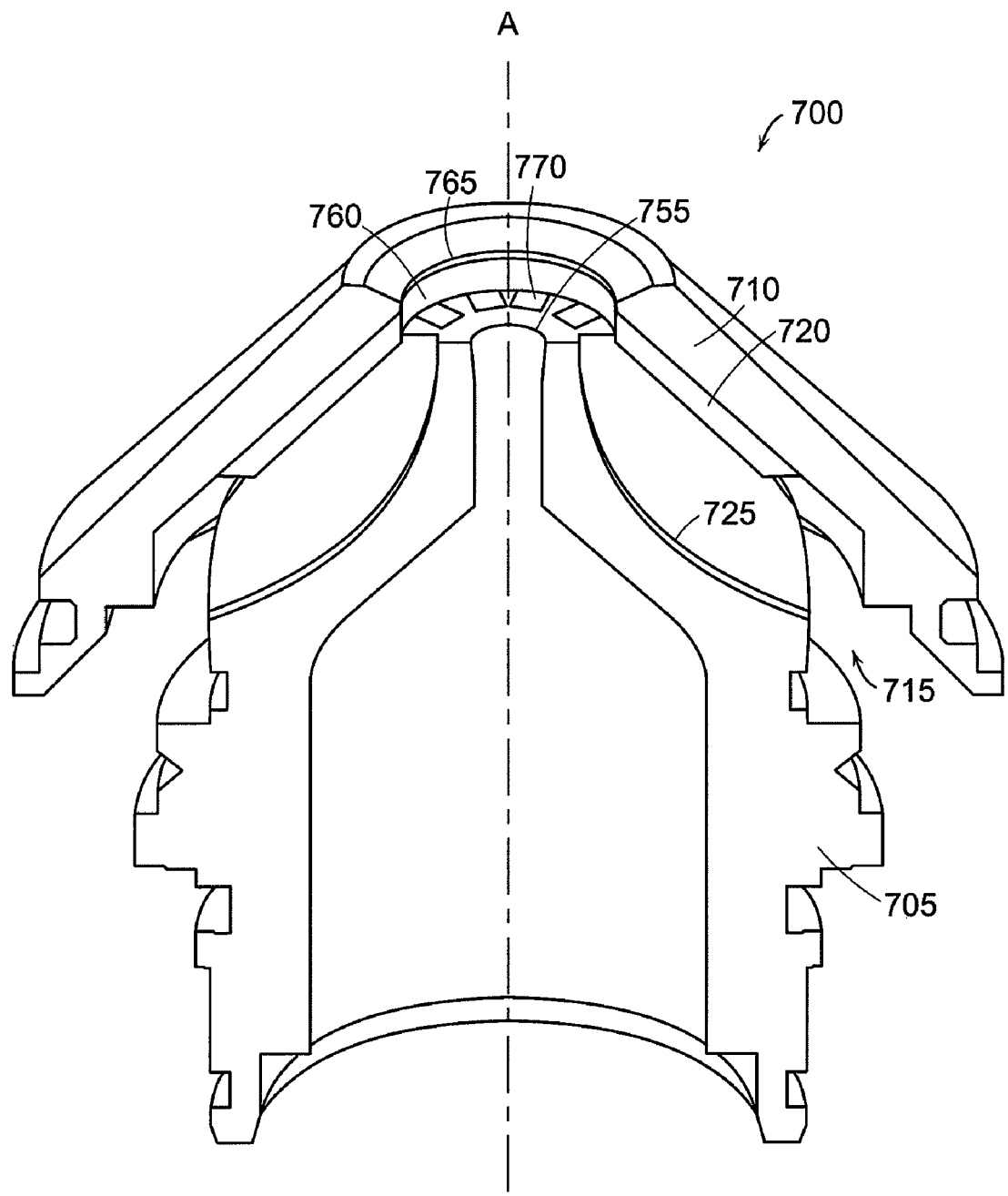
Figure 7C:
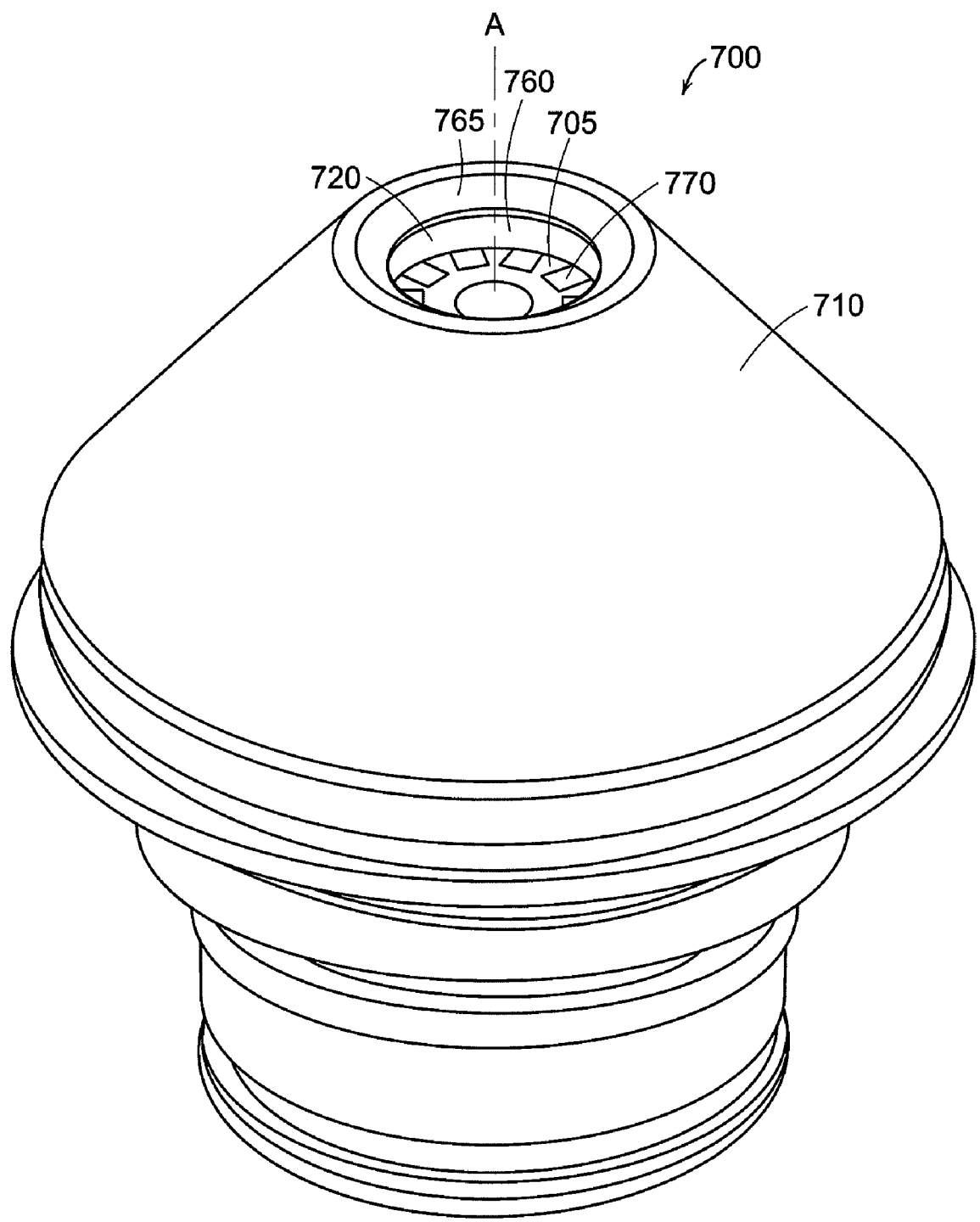

FIGS. 7A-7C illustrate an exemplary embodiment of a torch tip including a sealing component. FIG. 7A is a cross-sectional view of a torch tip 700. The torch tip 700 includes a nozzle 705 and a shield 710 mounted in a spaced relation relative to a longitudinal axis A to form a secondary gas passageway 715 therebetween. A sealing component 720 is positioned between the nozzle 705 and the shield 710. In some embodiments, the sealing component 720 is mounted in a circumscribing relationship to the nozzle 705. The sealing component 720 is in physical contact with both the nozzle 705 and the shield 710. As depicted, the sealing component 720 cooperates with the nozzle 705 to form a portion of fluid passageways 725. An interior surface 730 of the shield 710 also cooperates with the nozzle 705 to form the fluid passageways 725. The nozzle 705 includes a front portion 735 and a rear portion 740 substantially adjacent to the front portion 735. The fluid passageways 725 extend from a first end 745 of the front portion 735 to a second end 750.

FIG. 7B is a perspective cross-sectional view of the torch tip of FIG. 7A. The nozzle 705 defines a plasma exit portion 755 for ejecting the plasma jet from the torch tip. The sealing component 720 defines an exit portion 760 substantially coaxial with a shield exit portion 765 and the plasma exit portion 755. The discrete gas jets are formed at passageway exit portions 770 of the fluid passageways 725 to surround a plasma jet ejected from the plasma exit portion 755.

In some embodiments, the sealing component 720 creates an obstruction in the secondary passageway 715 to effectively direct fluid through the fluid passageways 725 by reducing flowing back pressure at that point in the fluid flow path, thereby increasing velocity in the direction of the fluid passageways 725 and inducing additional gas flow. The passageway exit portions 770 can be formed by cooperation of the fluid passageways 725, the sealing component 720, and the shield 710.

FIG. 7C is a perspective view of the torch tip 700 of FIGS. 7A & 7B. The sealing component 720 is disposed between the nozzle 705 and the shield 710. The exit portion 760 of the sealing component 720 is illustrated as having an axial length approximately the same as the shield exit portion 765. In some embodiments, the exit portion 760 has an axial length that is smaller than the axial length of the shield exit portion 765. For example, the sealing component 720 can be a coating that can be applied or deposited on an exterior surface 775 of the nozzle 705 (as shown in FIG. 7A). Applying a coating as the sealing component 720 reduces the distance between the nozzle 705 and the shield 710, which in turn, reduces the distance from the nozzle 705 to the workpiece (not shown). Such a configuration improves the processing (e.g., cutting and piercing) of relatively thin workpieces. In some embodiments, the fluid passageways 725 form enclosed fluid pathways within the nozzle 705, and the nozzle 705 does not cooperate with the sealing component 720 to form the fluid passageways 725 or the passageway exit portions 770.

Figure 8A:
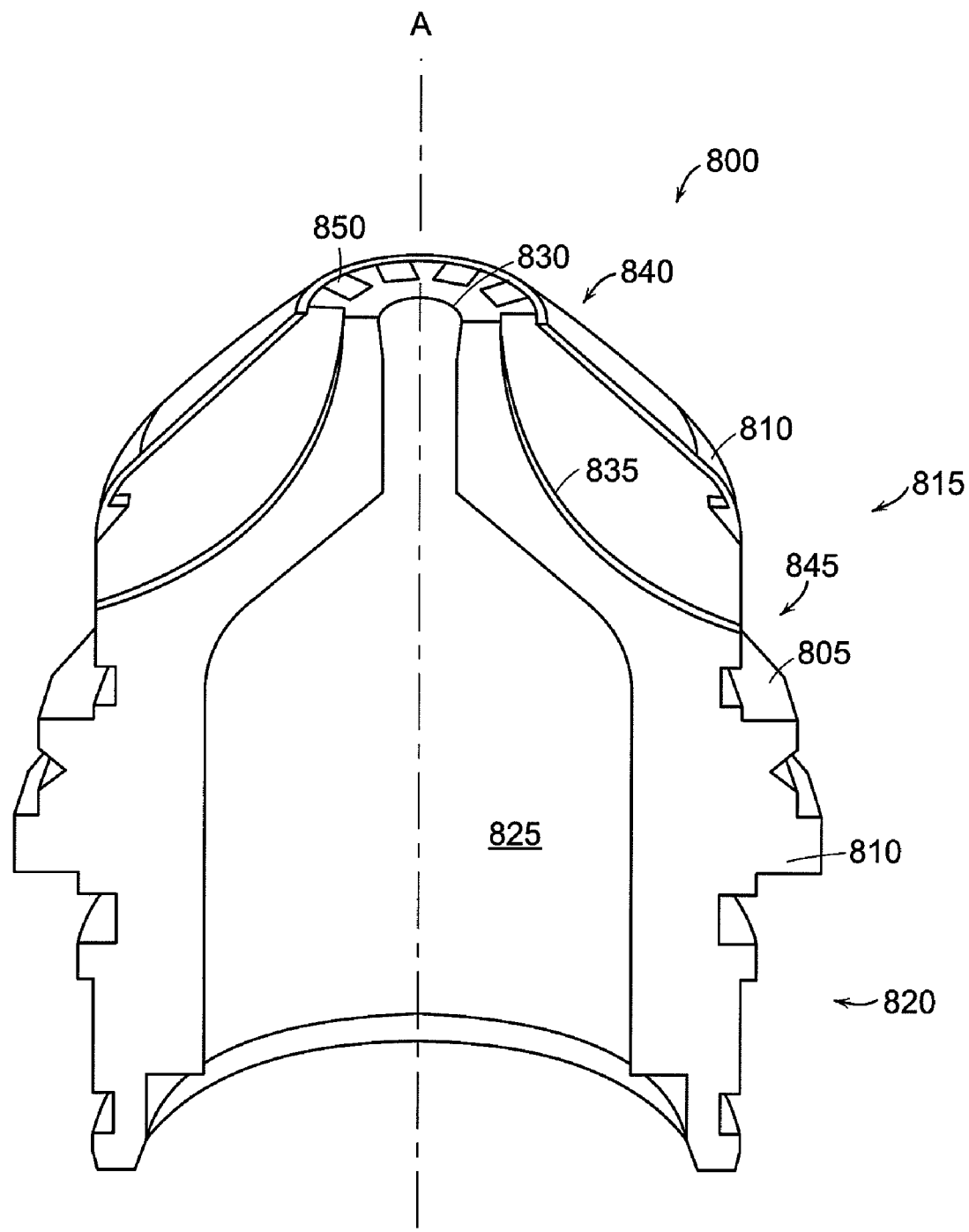
FIGS. 8A-8B depict an alternative embodiment of a torch tip including a circumscribing component.
Figure 8B:
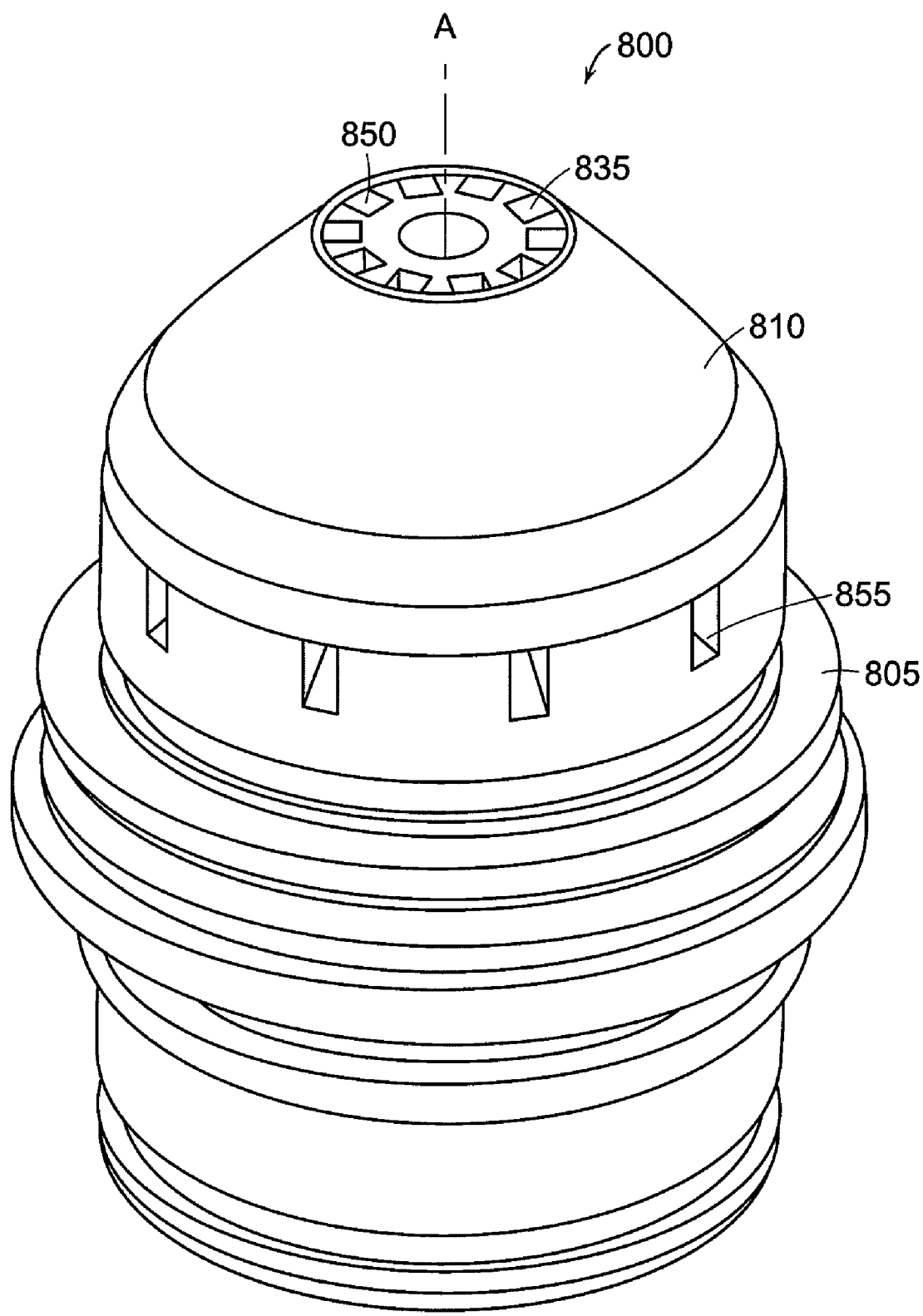

FIGS. 8A-8B depict an alternative embodiment of a torch tip including a circumscribing component. FIG. 8A is a perspective cross-sectional view of a torch tip 800. The torch tip 800 includes a nozzle 805 and a circumscribing component 810 disposed about the nozzle 805. The nozzle includes a front portion 815 and a rear portion 820. The rear portion 820 forms a portion of a plasma chamber 825. The front portion 815 defines a plasma exit portion 830 and fluid passageways 835. The fluid passageways 835 extend from a first end 840 of the front portion 815 to a second end 845 of the front portion 815 that is adjacent to the rear portion 820. Discrete gas jets (not shown) exit the torch tip 800 via passageway exit portions 850 that surround a plasma jet (not shown) ejected from the torch tip 800 via the plasma exit portion 830. In some embodiments, the discrete jets surround the plasma jet coaxially relative to the longitudinal axis A. In some embodiments, the discrete jets converge towards or diverge away from the plasma jet. In some embodiments, the discrete jets move in a swirling motion about the plasma jet.

FIG. 8B is a perspective view of the torch tip 800 of FIG. 8A. As illustrated, the circumscribing component 810 cooperates with the nozzle 805 to form the fluid passageways 835 and to form passageway exit portions 850. More specifically, the nozzle 805 defines a portion of the passageway exit portions 850, and the circumscribing component 810 defines a portion of the passageway exit portions 850. A fluid can be supplied to the fluid passageways 835 with passageway entry portions 855. As illustrated, the circumscribing component 810 does not circumscribe the passageway entry portions 855. In some embodiments, the circumscribing component 810 does circumscribe the passageway entry portions. An advantage of the torch tip 800 is the reduced need for a shield mounted relative to the torch tip 800. The circumscribing component 810 allows the torch tip 800 to operate in closer proximity to the workpiece (not shown) while still realizing the advantages of the discrete jets (e.g., improved arc stability, reduced noise, and improved cooling of the nozzle 805).

Figure 9A:
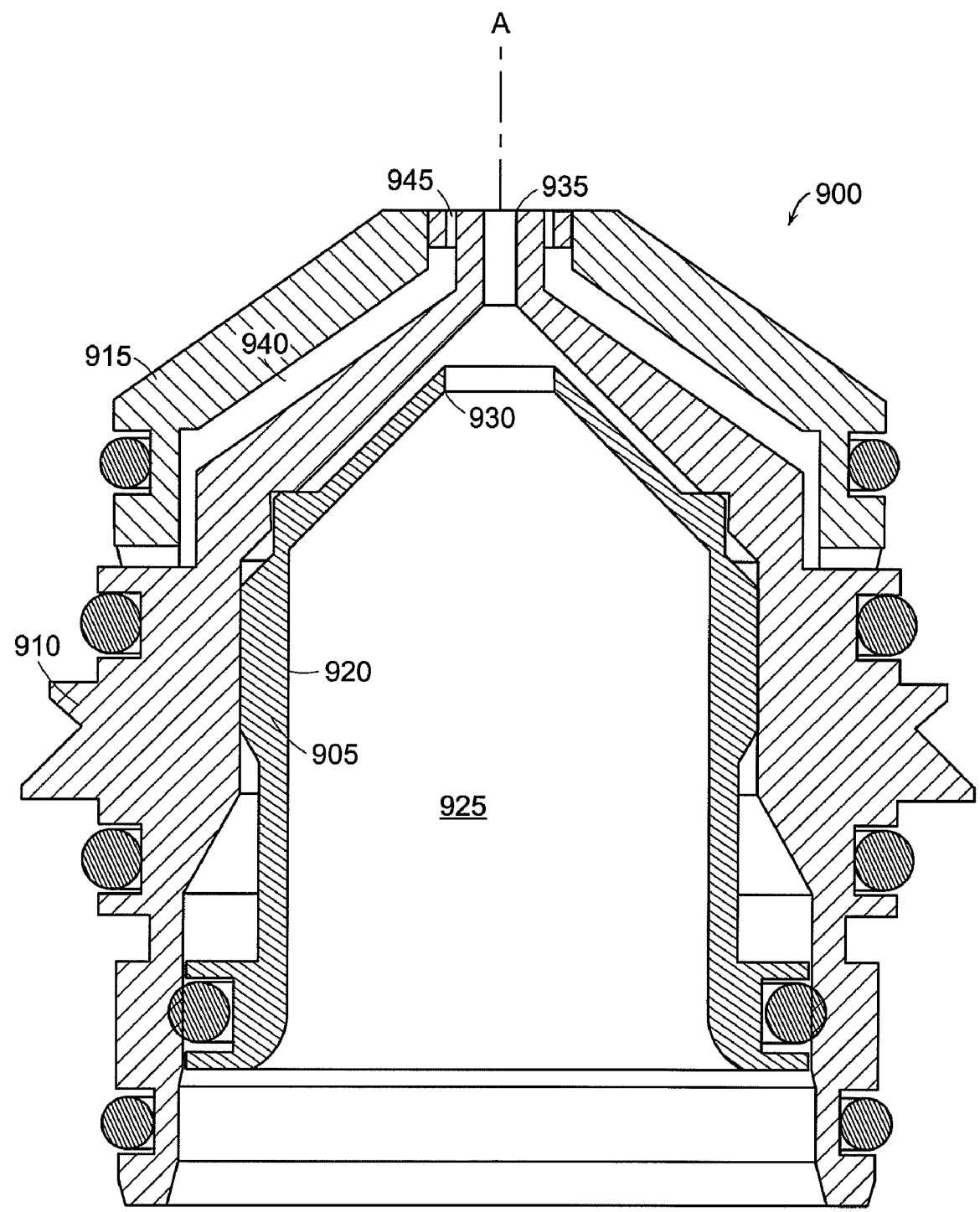
FIGS. 9A-9C illustrate an exemplary embodiment of a nozzle including a circumscribing component.
Figure 9B:
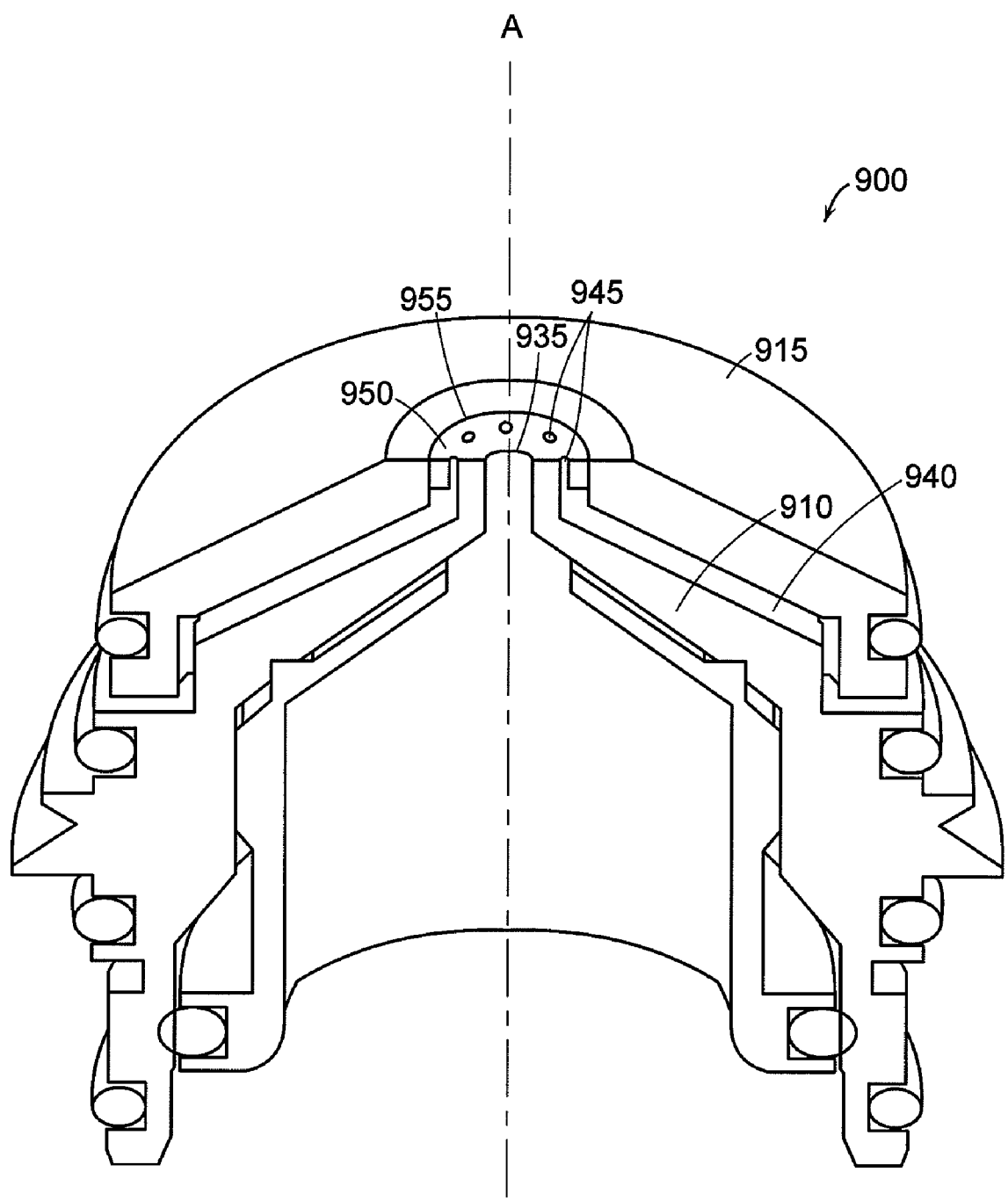
Figure 9C:
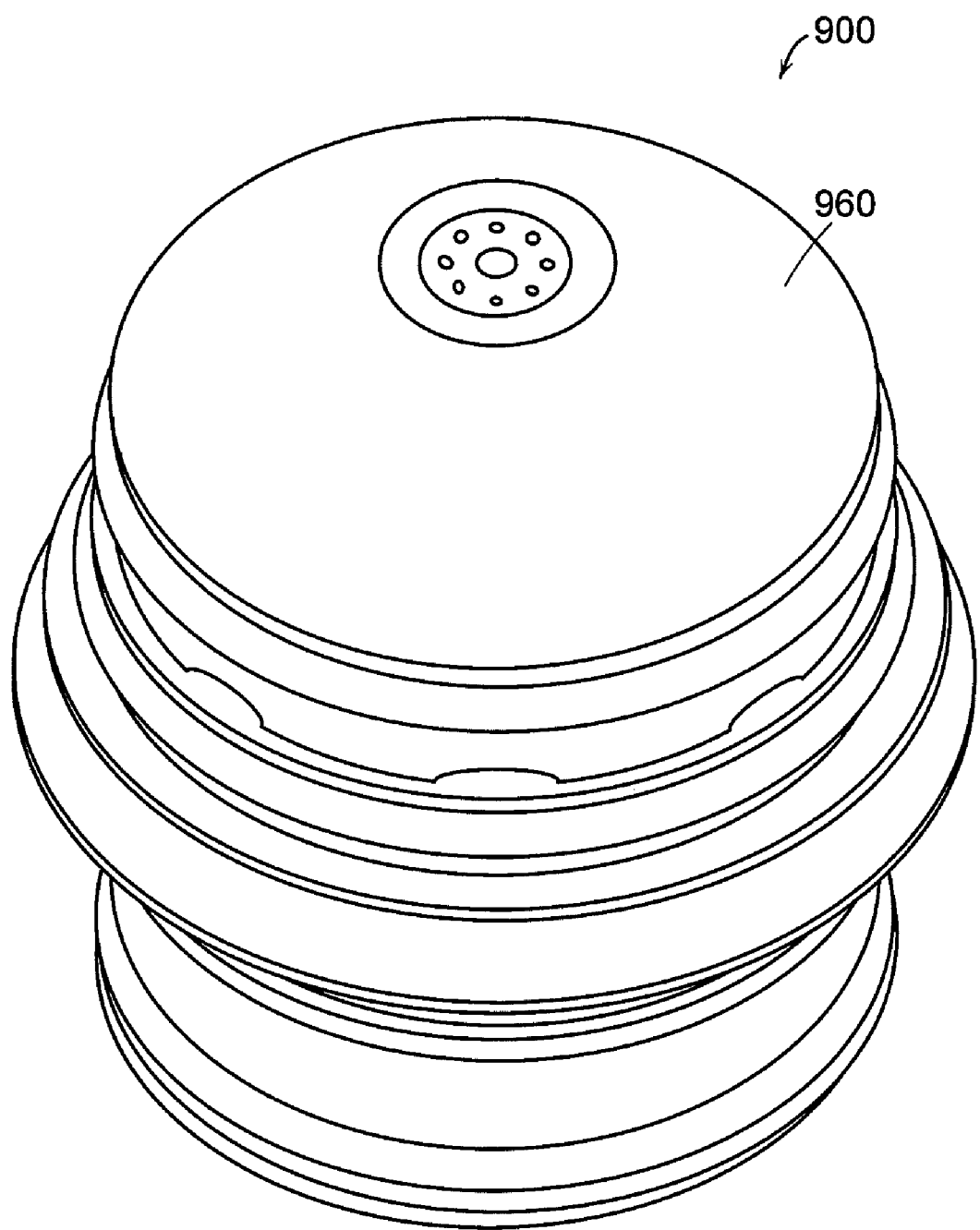

FIGS. 9A-9C illustrate an exemplary embodiment of a nozzle including a circumscribing component. FIG. 9A illustrates a nozzle system 900 that includes a liner portion 905, a shell portion 910 and a shell cap portion 915. An interior surface 920 of the liner portion forms a portion of a plasma chamber 925 and defines a liner exit portion 930. A plasma gas (not shown) flows with an axial component through the plasma chamber 925, through the liner exit portion 930, and exits the nozzle system 900 via the plasma exit portion 935 defined by the shell portion 910.

In some embodiments, the liner portion 905 and the shell portion 910 are positioned in physical contact, for example, by a friction fit. The physical contact can be a metal-to-metal interface for good conductivity of heat and electrical current. In some embodiments, the liner portion 905 and the shell portion 910 are integrally formed (e.g., manufactured from the same piece of material).

The shell cap portion 915 is mounted on the shell portion 910 in a spaced relationship relative to the longitudinal axis A to form a secondary gas passage 940 therebetween. In some embodiments, the shell cap portion 915 is made from an insulative material. In some embodiments, the shell cap portion 915 can be secured directly to the shell portion 910 by, for example, a friction fit.

FIG. 9B is a perspective cross-sectional view of the nozzle 900 of FIG. 9A. A fluid (not shown) can be provided to the secondary gas passage 940. The fluid flows through the fluid passageway 940 and exits the nozzle 900 as discrete gas jets via passageway exit portions 945 disposed in the shell portion 910. The shell portion 910 defines a radially extending flange 950 adjacent the plasma exit portion 935. The flange 950 defines the passageway exit portions 945. The flange 950 is in physical contact with the shell cap portion 915 to form an interface 955 therebetween. The interface 955 prevents secondary gas from leaking out of the nozzle 900.

In some embodiments, the interface 955 is formed by metal-to-metal contact. In some embodiments, a seal (not shown) is disposed between the flange 950 and the shell cap portion. In some embodiments, the shell cap portion 915 has a different flange defining passageway exit portions (not shown) integrally formed therewith, and the cap-flange cooperates with the with the shell portion 910 to form the region adjacent the plasma exit portion 935.

FIG. 9C is a perspective view of the nozzle 900 of FIGS. 9A & 9B. Several advantages are realized by the nozzle 900. The fluid that is provided to the secondary gas passageways 940 can be controlled independently of the plasma gas and a shield gas. Particularly, a separate gas supply source can be used to provide a secondary gas to the nozzle 900 that can have temperature, pressure, flow rate, or other parameters that differ from the plasma gas or the shield gas. The plasma gas can be separately controlled and flows through the plasma chamber 925. A shield gas can be separately controlled and flows over an exterior surface 960 of the shell cap portion 915. More specifically, the shield gas flows between the shell cap portion 915 and a shield (not shown). The nozzle 900 also allows the passageway exit portions 945 to be positioned in relatively closely to the plasma exit portion 935. Positioning the passageway exit portions 945 in such a configuration permits the discrete gas jets to be closer to the plasma jet, which is useful for low-current applications. In some embodiments, the discrete jets are formed with a secondary gas at a lower pressure relative to the shield gas to reduce impingement of the discrete jets on the plasma jet.

Figure 10:
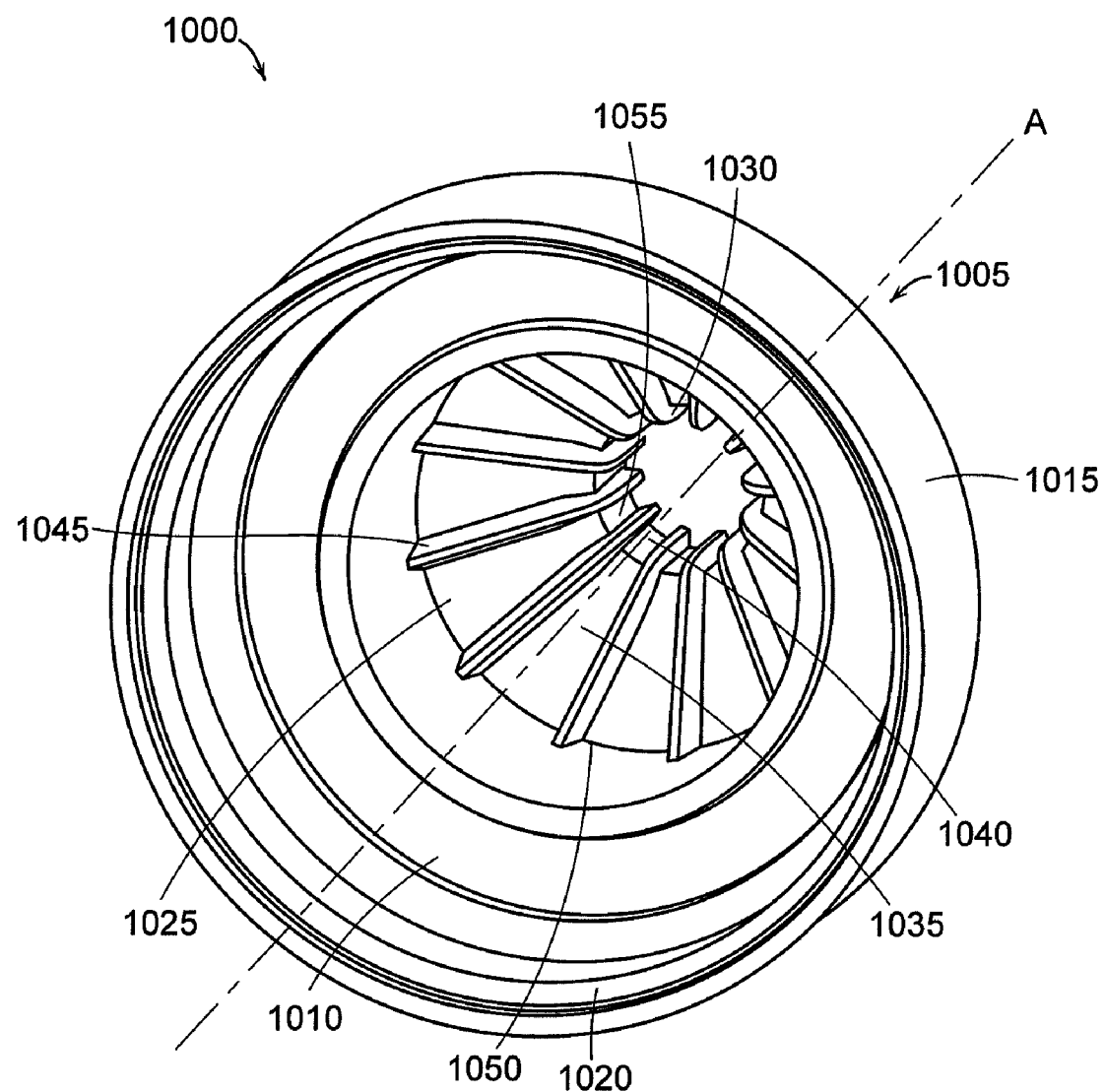
FIG. 10 is a perspective view of an embodiment of a shield in accordance with the invention.

FIG. 10 is a perspective view of an embodiment of a shield in accordance with the invention. The shield 1000 includes a shield body 1005 that defines an interior portion 1010 and an exterior portion 1015. The shield body 1005 includes a rear portion 1020 for detachably mounting to a plasma arc torch (not shown). The shield body 1005 also includes a front portion 1025 that defines a shield exit portion 1030. The shield 1000 is mounted coaxially relative to a nozzle (not shown) such that a plasma jet (not shown) exits the torch via the shield exit portion 1030.

The shield body 1005 also defines one or more shield passageway portions 1035 that extend along the front portion 1025 of the shield body 1005. The shield passageway portions 1035 each include a shield passageway exit portion 1040. As a second fluid flows from the rear portion 1020 to the front portion 1025 of the nozzle, the fluid enter the shield passageway portions 1035 and exit the shield 1000 (and the torch) as discrete jets via the shield passageway exit portions 1040. The discrete jets are disposed about the plasma jet to, for example, improve stability of the plasma jet or to reduce interactions between an ambient fluid and the plasma jet.

Figure 1A:
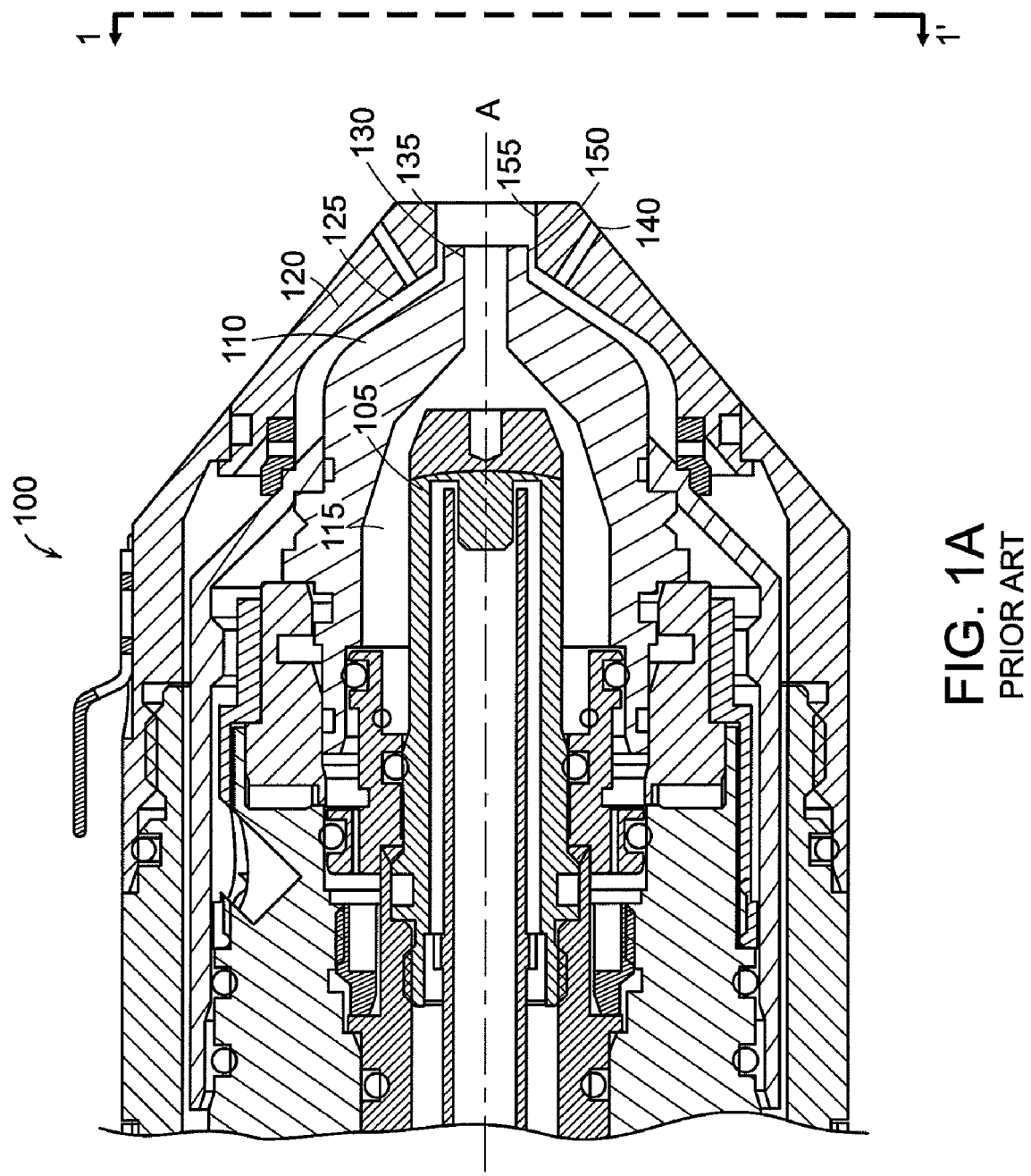
FIGS. 1A-1B depict a known plasma arc torch configuration associated with a coaxial shield flow design.
Figure 1B:
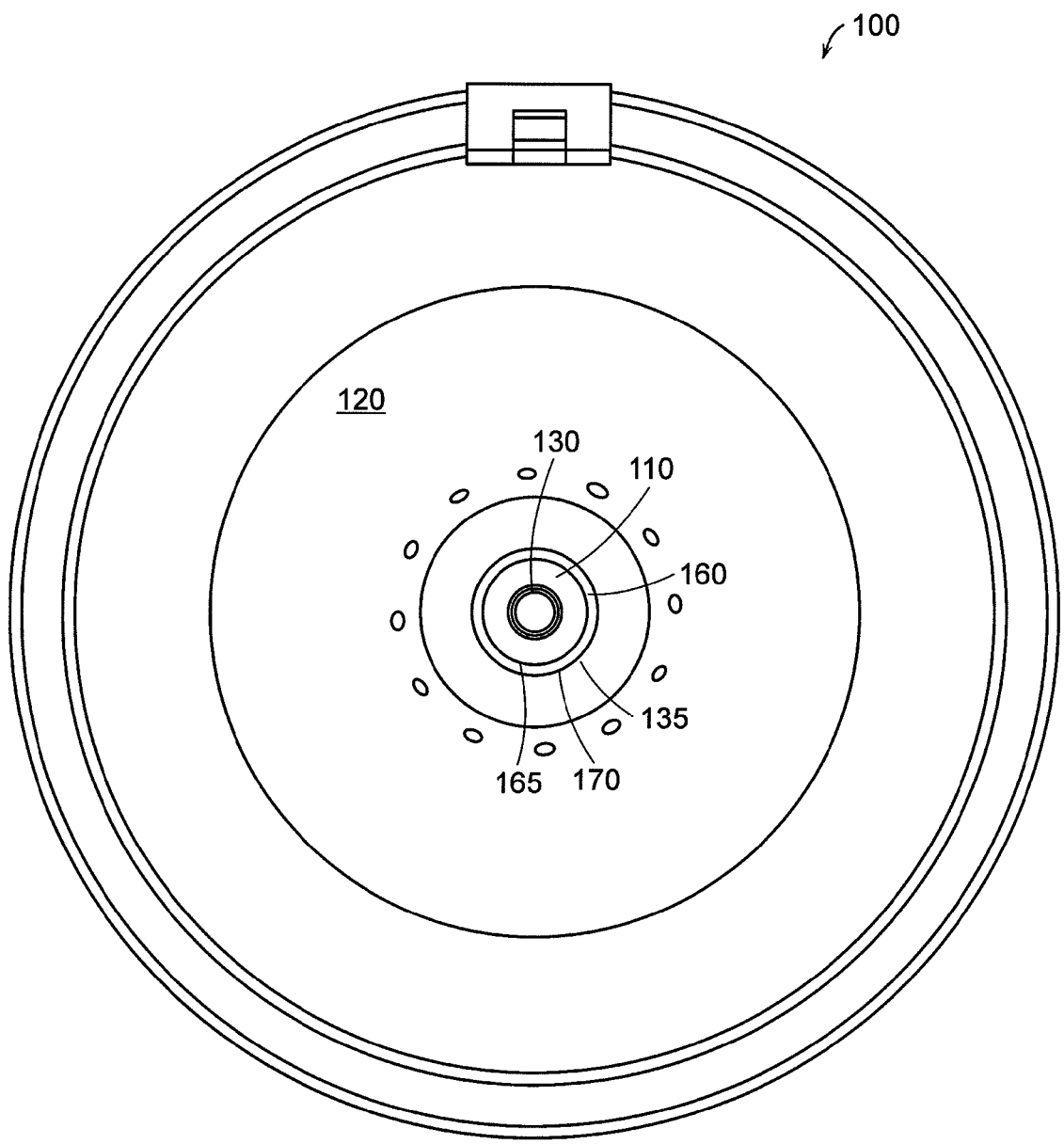

The front portion 1025 of the shield body 1005 defines protrusions 1045 that separate (e.g., and define) the shield passageway portions 1035. In some embodiments, the protrusions 1045 are in physical contact with an exterior surface of the nozzle when the shield 1000 is mounted on the torch. In such embodiments, the exterior surface of the nozzle (e.g., similar to a nozzle of FIG. 1A) cooperates with the shield passageway portions 1035 to form fluid passageways that can generate discrete jets from the shield passageway exit portions 1040. In some embodiments, the protrusions 1045 are disposed in a spaced relation relative to the nozzle when the shield 1000 is mounted on the torch. In some embodiments, the protrusions 1045 and the shield passageway portions 1035 are aligned with corresponding fluid passageways disposed in a nozzle or other circumscribing component. In this way, the shield 1000 can cooperate with the nozzle or other circumscribing component to form fluid passageways having a relatively larger cross-sectional area than is achieved by disposing the fluid passageways in a single component. Moreover, the additional surface area achieved by cooperative passageways assists in cooling both the shield 1000 and the nozzle or other circumscribing component.

The protrusions extend from the shield exit portion 1030 to a rear wall 1050 of the front portion 1025 of the shield 1000. In some embodiments, the protrusions 1045 do not extend to the rear wall 1050. In such embodiments, the protrusions can extend to a point (not shown) on the front portion 1025 between the rear wall 1050 and the shield exit portion 1030. In some embodiments, the geometry of the region 1055 adjacent the shield exit portion 1030 can influence the flow direction relative to the longitudinal axis A. For example, the region 1055 can direct the flow of the discrete jets to converge on the plasma jet, diverge from the plasma jet, swirl about the plasma jet, or flow coaxially relative to the plasma jet. In some embodiments, the protrusions 1045 and hence the shield passageway portions 1035 are formed integrally with the shield body 1005. In some embodiments, a separate component (not shown) can be disposed between an exterior surface of the nozzle and the shield 1000. Such a component provides fluid passageways that generate discrete jets for disposing about the plasma jet. The component can provide enclosed passageways (e.g., a portion of the passageways is not formed by at least one of the shield body 1005 or the nozzle). Such a component can be made, for example, with an electrically conductive or insulative material.

Other configurations that are within the scope and spirit of the invention will be apparent to those of skill in the art. For example, a ring (not shown) defining passageway exit portions can be disposed between a nozzle and a shield to form a three-piece torch tip. A secondary fluid flowing through a secondary gas passage disposed between the nozzle and the shield can generate discrete jets disposed about a plasma jet when the secondary fluid flows through the passageway exit portions. The ring can be secured between the nozzle and the shield, for example, by a diametral interference fit. Other mechanisms to secure the components can be used, for example, bonding, welding, or fusing any of the three pieces together.

While the invention has been described with respect to various embodiments, variations, modifications, and other implementations of what is described herein will occur to those of ordinary skill in the art without departing from the spirit or the scope of the invention. Accordingly, the invention is not to be limited only to the preceding illustrative descriptions.

What is claimed is:

1. A nozzle for a transferred arc plasma cutting torch comprising, the nozzle comprising:
    a rear portion defining at least a portion of a plasma chamber; and
    a front portion including a first end disposed adjacent to the rear portion, a second end defining a plasma exit portion, and a plurality of gas passageways disposed within the front portion, each of the plurality of gas passageways extending from the first end to the second end and defining a gas path that provides a flow of secondary gas that exits the gas passageway via a gas passageway exit portion, each gas passageway exit portion being (a) disposed adjacent the plasma exit portion and (b) coplanar with the plasma exit portion,
    the plurality of gas passageways and gas passageway exit portions, in combination, providing a plurality of discrete jets of the secondary gas which are disposed substantially parallel to a plasma jet and which reduce entrainment of an ambient fluid or the secondary gas into the plasma jet.

2. The nozzle of claim 1, wherein the plurality of gas passageways each define a gas path that generates substantially parallel flow between the secondary gas exiting the passageway exit portion and the plasma jet.

3. The nozzle of claim 1, wherein the plurality of gas passageways, in combination, generate a plurality of discrete jets that coaxially surround the plasma jet.

4. The nozzle of claim 1, wherein each of the plurality of gas passageways generates diverging angular flow of the secondary gas exiting the passageway exit portion relative to the plasma jet.

5. The nozzle of claim 1, wherein the discrete jets reduce an interaction between an ambient fluid and the plasma jet.

6. The nozzle of claim 1, wherein the plurality of fluid passageways form a radial arrangement about the plasma exit portion.

7. The nozzle of claim 1, wherein the front portion further includes a relief flat disposed along a side of each of the plurality of gas passageways to increase an amount of the secondary gas flow that enters into the plurality of gas passageways.

8. The nozzle of claim 1, wherein the plurality of gas passageways impart a swirling motion to the secondary gas.

9. The nozzle of claim 1, wherein the rear portion further includes a securing mechanism for securing the nozzle to a plasma torch body.

10. The nozzle of claim 1, wherein the front and rear portions are formed from an electrically conductive material.

11. The nozzle of claim 1, further comprising a circumscribing component defining an interior surface and an exterior surface, the circumscribing component mounted relative to the front portion such that at least a portion of the interior surface cooperates with the front portion to form the plurality of gas passageways.

12. The nozzle of claim 11, wherein the interior surface of the circumscribing component defines a portion of one or more discrete gas passageways that correspond to the plurality of gas passageways disposed on the front portion of the nozzle.

13. The nozzle of claim 1, further comprising a circumscribing component defining an interior surface and an exterior surface, the circumscribing component mounted relative to the front portion of the nozzle such that at least a portion of the interior surface cooperates with the front portion to form a secondary gas passageway.

14. The nozzle of claim 13, wherein a secondary gas flows through the secondary gas passageway independently of a plasma gas that flows through the plasma chamber and a shielding gas that flows over the exterior surface of the circumscribing component.

15. The nozzle of claim 1, wherein each of the plurality of gas passageways provide a discrete path for the secondary gas.

* * * * *

UNITED STATES PATENT AND TRADEMARK OFFICE
CERTIFICATE OF CORRECTION

PATENT NO. : 7,598,473 B2  Page 1 of 1
APPLICATION NO. : 11/432282
DATED : October 6, 2009
INVENTOR(S) : Cook et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 470 days.

Signed and Sealed this

Twenty-eighth Day of September, 2010

David J. Kappos
*Director of the United States Patent and Trademark Office*